(12) United States Patent
Jafry et al.

(10) Patent No.: US 8,928,724 B2
(45) Date of Patent: Jan. 6, 2015

(54) UNIFIED USER EXPERIENCE FOR MOBILE CALLS

(75) Inventors: Syed Mansoor Jafry, Kirkland, WA (US); Keith Kaplan, Bothell, WA (US); Kerry D. Woolsey, Duvall, WA (US); Peter Bergler, Duvall, WA (US); Ted Chen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 200 days.

(21) Appl. No.: 13/601,761

(22) Filed: Aug. 31, 2012

(65) Prior Publication Data

US 2014/0063175 A1    Mar. 6, 2014

(51) Int. Cl.
*H04N 7/14* (2006.01)

(52) U.S. Cl.
USPC ..................................... 348/14.03; 348/14.02

(58) Field of Classification Search
USPC ........................ 348/14.01, 14.02, 14.03, 14.08
See application file for complete search history.

(56) References Cited

U.S. PATENT DOCUMENTS

| | | | |
|---|---|---|---|
| 8,036,633 B2 * | 10/2011 | Islam et al. | ................. 455/404.1 |
| 8,090,087 B2 * | 1/2012 | Jobs et al. | ................... 379/93.21 |
| 2005/0190747 A1 | 9/2005 | Sindhwani et al. | |
| 2006/0217112 A1 | 9/2006 | Mo | |
| 2007/0142047 A1 | 6/2007 | Heeschen et al. | |
| 2010/0124211 A1 | 5/2010 | Payyappilly et al. | |
| 2010/0257490 A1 * | 10/2010 | Lyon et al. | ..................... 715/863 |
| 2011/0249073 A1 * | 10/2011 | Cranfill et al. | ............. 348/14.02 |
| 2012/0019610 A1 * | 1/2012 | Hornyak et al. | ........... 348/14.02 |

OTHER PUBLICATIONS

STACVIP VoIP Telephone Talkshow System, Retrieved on: May 29, 2012, 2 pages. Available at: http://www.comrex.com/downloads/brochures/STAC%20VIP%20Brochure.pdf.
"Horizon Mobile Apps.", Retrieved on: May 29, 2012, 12 pages. Available at: http://www.onehorizongroup.com/sites/default/files/product_information/Horizon%20for%20mobile.pdf.
"Linphone", Retrieved on: May 29, 2012, 18 pages. Available at: http://www.androidauthority.com/best-android-apps-voip-sip-calls-wi-fi-calling-internet-calling-87396/.
"Cisco Mobile 8.1 for iPhone Deployment Guide", Retrieved on: May 29, 2012, 12 pages. Available at: http://www.cisco.com/en/US/prod/collateral/voicesw/ps6789/ps7290/ps7271/deployment_guide_c07-641141.html.

* cited by examiner

*Primary Examiner* — Olisa Anwah
(74) *Attorney, Agent, or Firm* — Bryan Webster; Kate Drakos; Micky Minhas

(57) ABSTRACT

VoIP calls associated with VoIP applications installed on a mobile computing device are treated similar to calls not associated with installed VoIP applications. VoIP applications invoke the same native incoming call user interface that is invoked when a mobile device detects an incoming call that is not associated with an installed VoIP application. Mobile devices can simultaneously host a VoIP call and a call not associated with an installed VoIP application while a mobile device is locked. A reduced call user interface is displayed while a mobile device is simultaneously hosting multiple calls. Selection of the reduced call user interface causes the mobile device to make the active call the inactive call and vice versa. The reduced call user interface is managed by the mobile device operating system.

18 Claims, 17 Drawing Sheets

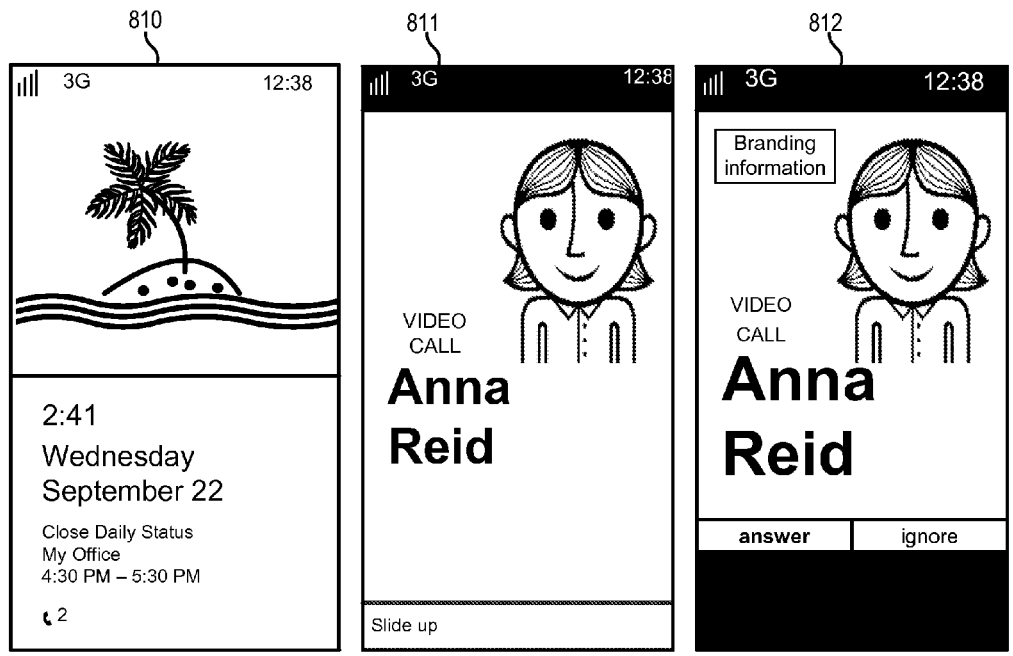
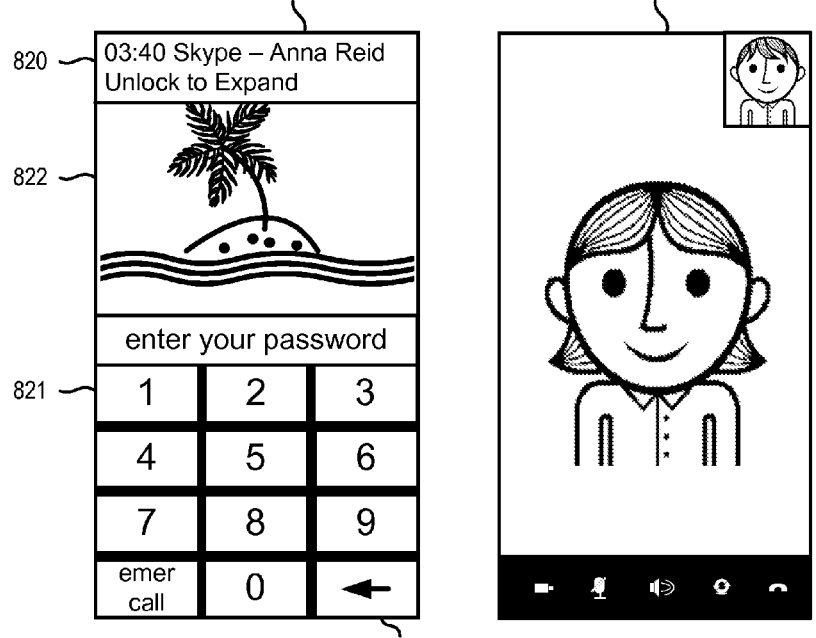
FIG. 8(a)  FIG. 8(b)  FIG. 8(c)
FIG. 8(d)  FIG. 8(e)

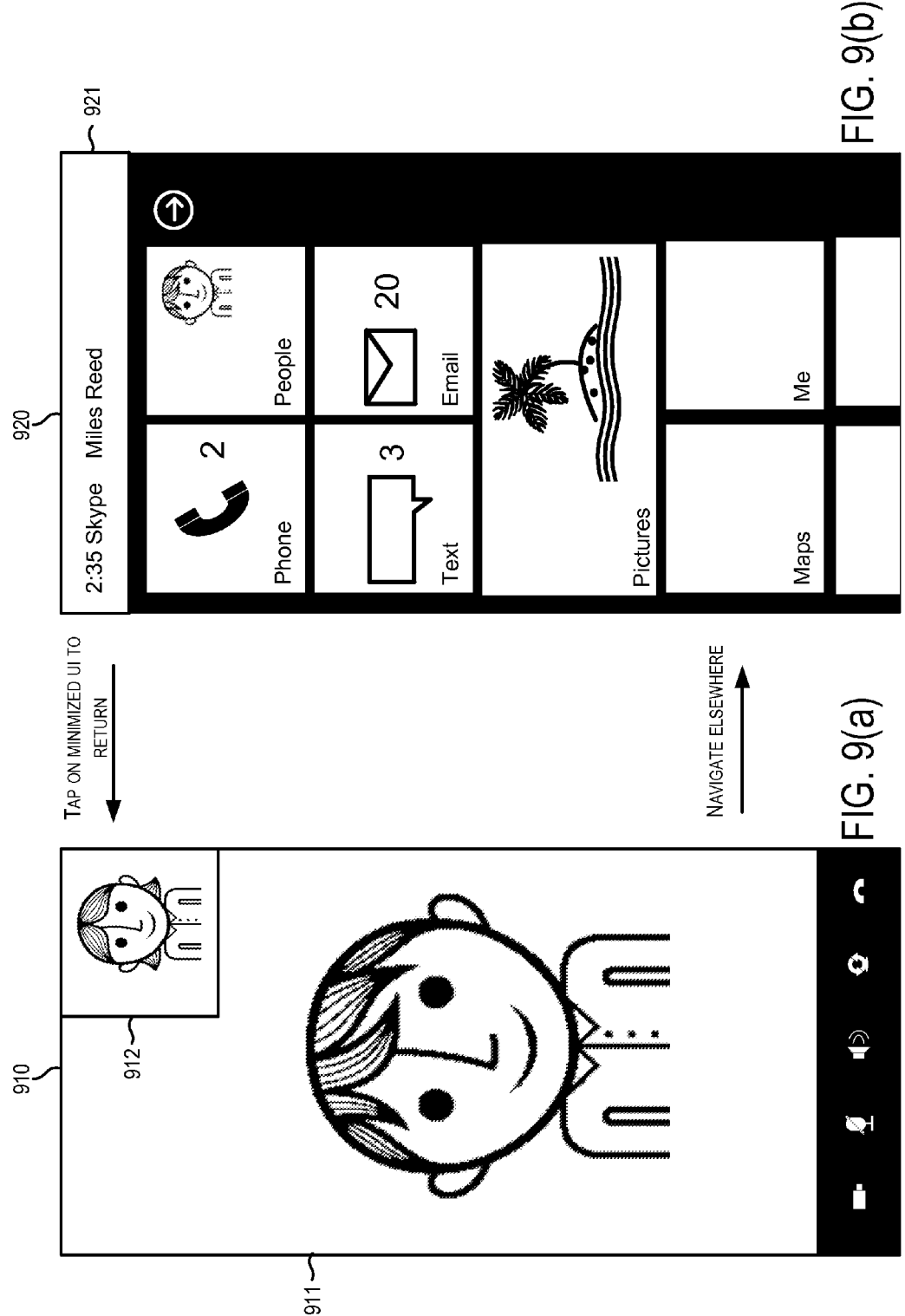

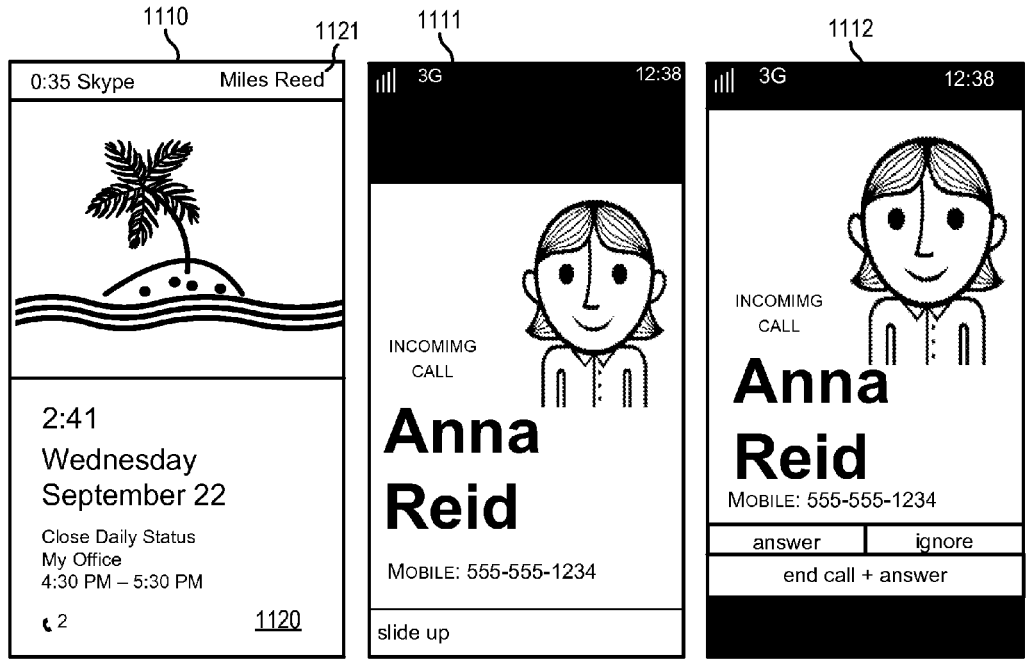
FIG. 11(a)    FIG. 11(b)    FIG. 11(c)
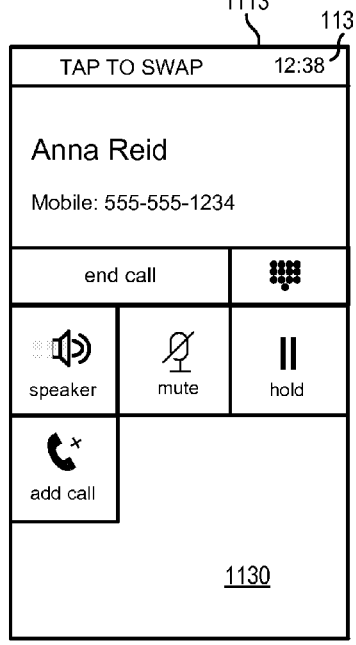 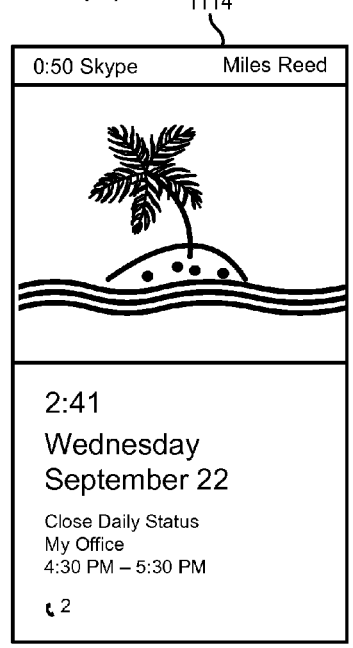
FIG. 11(d)    FIG. 11(e)

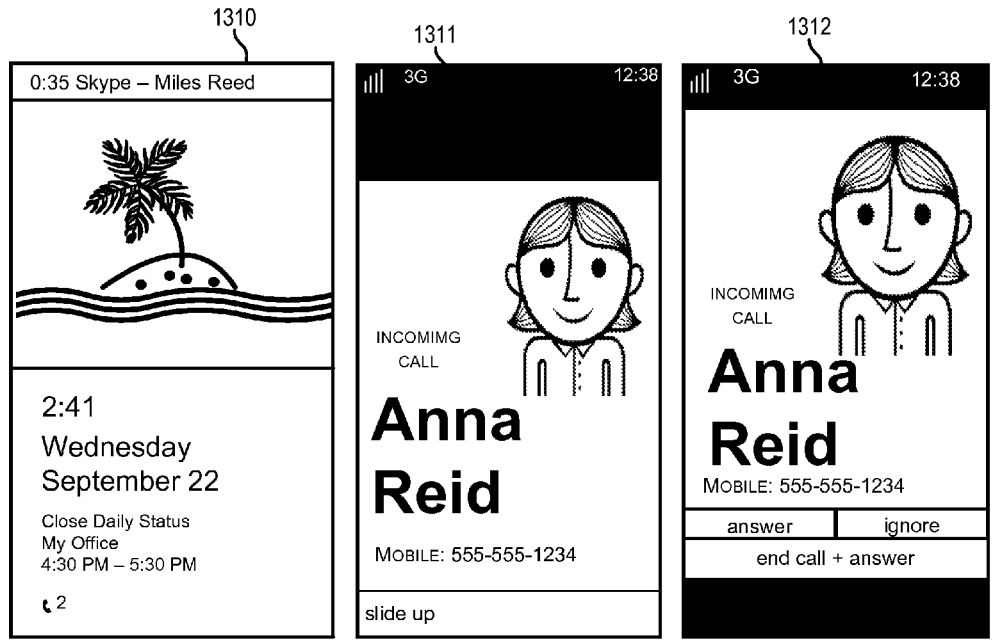
FIG. 13(a)  FIG. 13(b)  FIG. 13(c)
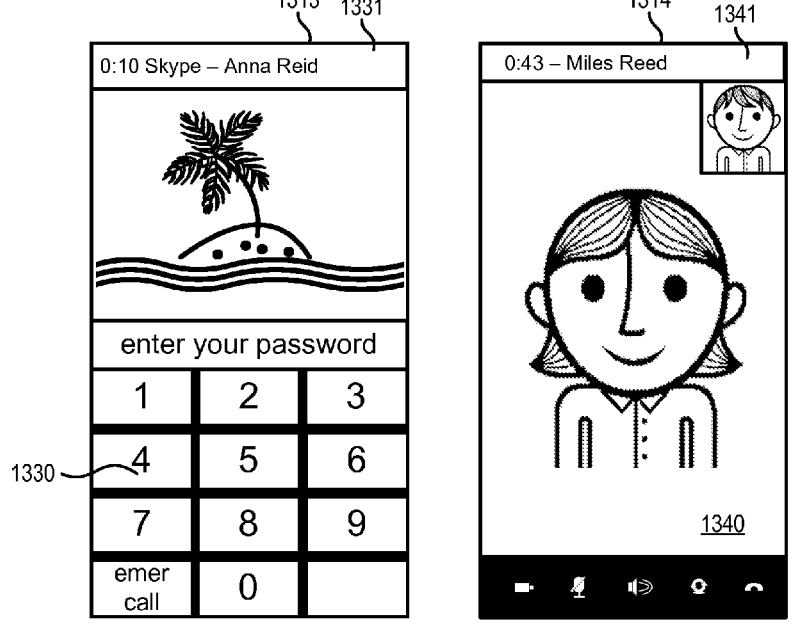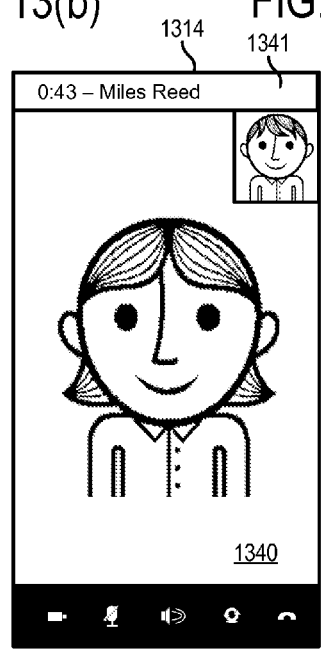
FIG. 13(d)  FIG. 13(e)

UNIFIED USER EXPERIENCE FOR MOBILE CALLS

BACKGROUND

The concept of a "call" in smartphones has grown beyond just audio calls to calls that include Voice-over-IP (VoIP) services. Smartphone operating systems primarily cater to calls associated with a mobile network operator with which a smartphone user has a subscription, with third-party VoIP applications typically providing VoIP services. When a smartphone hosts a VoIP call, the corresponding VoIP application typically manages the in-call user experience.

SUMMARY

This Summary is provided to introduce a selection of concepts, in a simplified form, that are further described hereafter in the Detailed Description. This Summary is not intended to identify key features or essential features of the claimed subject matter nor is it intended to be used to limit the scope of the claimed subject matter.

The technologies described herein provide a unified user experience for mobile calls hosted at a mobile computing device. In one embodiment, a mobile device detects an incoming VoIP call associated with a VoIP application installed on the mobile device and invokes the mobile device's native incoming call user interface. The native incoming call user interface invoked for a VoIP call is the same user interface that is invoked when the mobile device detects a call that is not associated with a VoIP application installed on the mobile device. The mobile device then presents an incoming call user interface for the incoming VoIP call at the display of the mobile computing device.

In another embodiment, a mobile device can host multiple calls while the mobile device is password-locked and switch between calls while in a locked state via a reduced call user interface. If the active call is a VoIP call and the user unlocks the mobile device, the device navigates to the VoIP application associated with the VoIP call and the user is presented with a full in-call user experience provided by the VoIP application.

The foregoing and other objects, features and advantages of the disclosed technologies will become more apparent from the following Detailed Description, which proceeds with reference to the accompanying figures.

BRIEF DESCRIPTION OF THE DRAWINGS

FIGS. 8(a)-8(e) show illustrations of user interfaces of an exemplary incoming call user experience presented when a mobile computing device is password-locked.

FIGS. 9(a) and 9(b) show illustrations of exemplary user interfaces presented when a call is switched between being active and inactive.

FIGS. 11(a)-11(e) show illustrations of exemplary user interfaces presented as part of an incoming call user experience when a locked mobile computing device is hosting a VoIP call and receives an incoming call not associated with a VoIP application.

FIGS. 13(a)-13(e) show illustrations of exemplary user interfaces presented as part of an incoming call user experience when a password-locked mobile computing device is already hosting a VoIP call and receives an incoming VoIP call associated with the same VoIP application as the existing VoIP call.

DETAILED DESCRIPTION

The technologies described herein allow for a unified user experience for mobile calls hosted at a mobile computing device. A user can be presented with a user experience for VoIP calls associated with a VoIP application installed on the mobile computing device that is similar to the user experience presented for calls that are not associated with installed VoIP applications. Typically, calls not associated with VoIP applications comprise calls that are associated with a mobile operator (MO) with which a mobile device user has a subscription and whose mobile network infrastructure the user's mobile device is authorized to use for receiving and placing calls. Thus, calls not associated with VoIP applications on a mobile device may be associated with SIM cards located in the mobile device. In some cases, these calls can comprise both audio and video streams. VoIP applications are able to invoke the same incoming user interface invoked for calls not associated with VoIP applications, control call settings (mute, speakerphone, etc.) and can co-exist with calls not associated with the VoIP application, even when a mobile computing device is locked. Thus, using the methods provided herein, VoIP calls are given privileges conventionally given only to calls not associated with installed VoIP applications.

Figure 1:
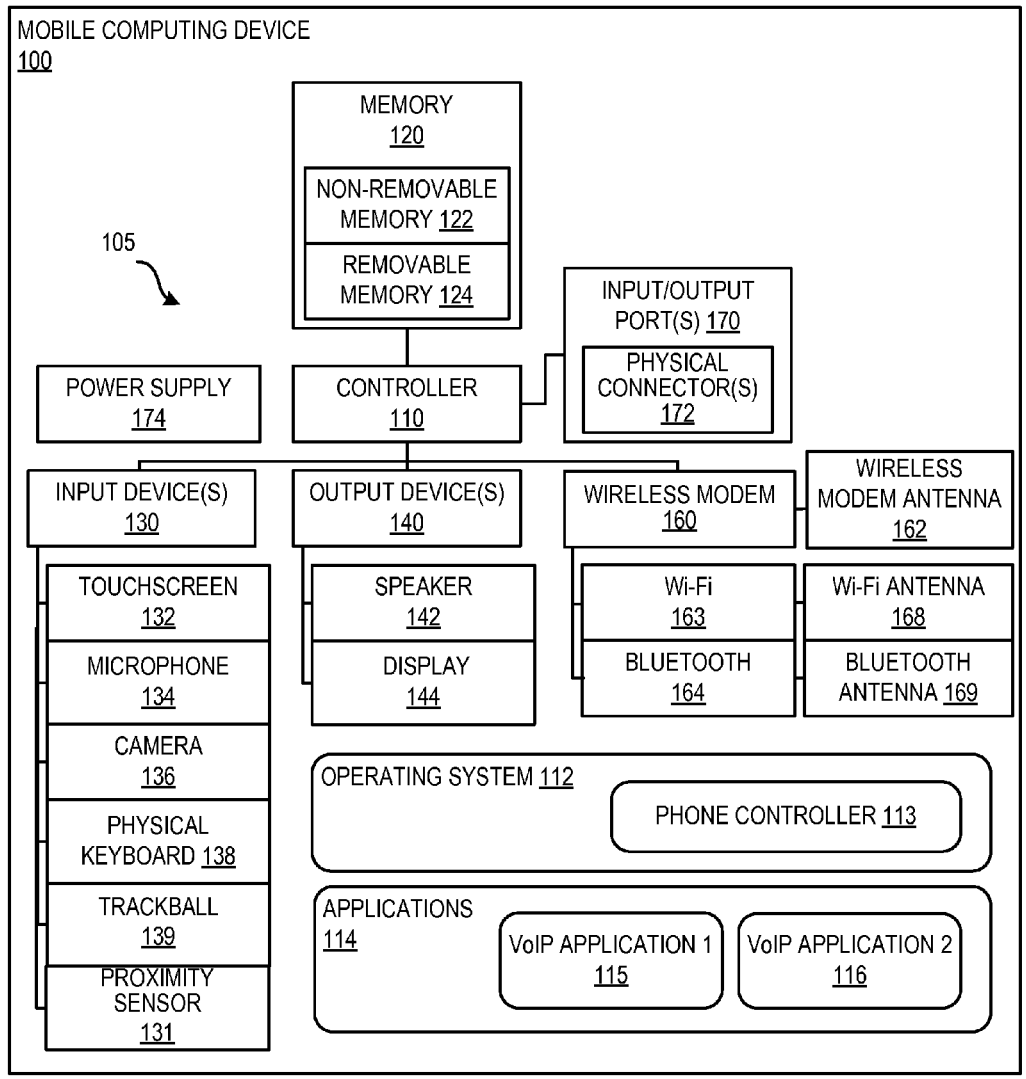
FIG. 1 is a system diagram depicting an exemplary mobile computing device.

FIG. 1 is a system diagram depicting an exemplary mobile computing device 100 (mobile device) that can be used to perform any of the methods described herein. The mobile device 100 includes a variety of optional hardware and software components 105. Generally, components 105 can communicate with other components, although not all connections are shown, for ease of illustration. The mobile device 100 can be any of a variety of mobile devices such as a cell phone, smartphone, handheld computer, laptop computer, notebook computer, tablet device, slate device, media player, Personal Digital Assistant (PDA), camera, or video camera and can be a computing device traditionally not considered to be mobile such as a desktop computer, server, gaming console or smart television. The mobile device 100 can allow wired or wireless communication with one or more networks, such as a wireless local area network (WLAN), cellular or satellite network.

The mobile device 100 can include a controller or processor 110 (e.g., signal processor, graphics processing unit (GPU), microprocessor, ASIC, or other control and processing logic circuitry or software) for performing such tasks as signal coding, graphics processing, data processing, input/output processing, call management, power control, and/or other functions. An operating system 112 can control the allocation and usage of the components 105 and support for one or more application programs 114. The application programs 114 can include one or more Voice over Internal Protocol (VoIP) communication applications 115-116 (such as Skype™) common mobile computing applications (e.g., email applications, calendars, contact managers, web browsers, messaging applications) as well as other computing applications. The operating system 112 can comprise a phone controller 113 capable of supporting a unified user experience for calls associated with VoIP applications and other calls at a mobile device.

The mobile device 100 can include memory 120. Memory 120 can include non-removable memory 122 and removable memory 124. The non-removable (or embedded) memory 122 can include RAM, ROM, flash memory, a hard drive, or other memory storage technologies. The removable memory 124 can include flash memory cards (e.g., SD (Secure Digital) cards), memory sticks, Subscriber Identity Module (SIM) cards, which are well known in GSM (Global System for Mobile Communication) systems, or other memory storage technologies, such as "smart cards." The memory 120 can be used for storing data and/or computer-executable instructions for running the operating system 112 and the application programs 114 on the mobile device 100. Example data can include web pages, text, images, sound files, audio and video data (which could be part of a phone call) or other data sets to be sent to and/or received from one or more network servers or other devices by the mobile device 100 via one or more wired or wireless networks. The mobile device 100 can also have access to external memory (not shown) such as external hard drives.

The mobile device 100 can support one or more input devices 130, such as a touch screen 132, microphone 134, camera 136, physical keyboard 138 and/or trackball 139 and one or more output devices 140, such as a speaker 142 and a display 144. Other possible output devices (not shown) can include piezoelectric or other haptic output devices. Any of the input devices 130 and output devices 140 can be internal to, external to, or removably attachable with the computing device 100. External input and output devices 130 and 140 can communicate with the mobile device 100 via wired or wireless connections. Some devices can serve more than one input/output function. For example, touchscreen 132 and display 144 can be combined in a single input/output device.

The computing device 100 can further provide one or more natural user interfaces (NUIs). For example, the operating system 112 or applications 114 can comprise speech-recognition software as part of a voice user interface that allows a user to operate the device 100 via voice commands. Further, the device 100 can comprise input devices and software that allows a user to interact with the device 100 via a user's spatial gestures. For example, a user's spatial gestures can be detected and interpreted to provide input to a gaming application.

A wireless modem 160 can be coupled to a wireless modem antenna 162 and can support two-way communications between the mobile computing device 100 and external devices, such as wireless network components, as is understood in the art. The modem 160 and the antenna 162 are shown generically and can be a wireless cellular modem for communicating with a mobile cellular communication network. The wireless modem 160 can comprise other radio-based modems such as a Wi-Fi modem 163 or a Bluetooth modem 164, each of which can be coupled to its own antenna (e.g., Wi-Fi antenna 168, Bluetooth antenna 169). The wireless modem 160 is typically configured for communication with one or more cellular networks, such as a GSM network for data and voice communications within a single cellular network, between cellular networks, or between the mobile computing device and a public switched telephone network (PSTN).

The mobile computing device 100 can further include at least one input/output port 170 (which can be, for example, a USB port, IEEE 1394 (FireWire) port, and/or RS-232 port) comprising physical connectors 172 and a power supply 174. The illustrated components 105 are not required or all-inclusive, as any components can be deleted and other components can be added.

Figure 2:
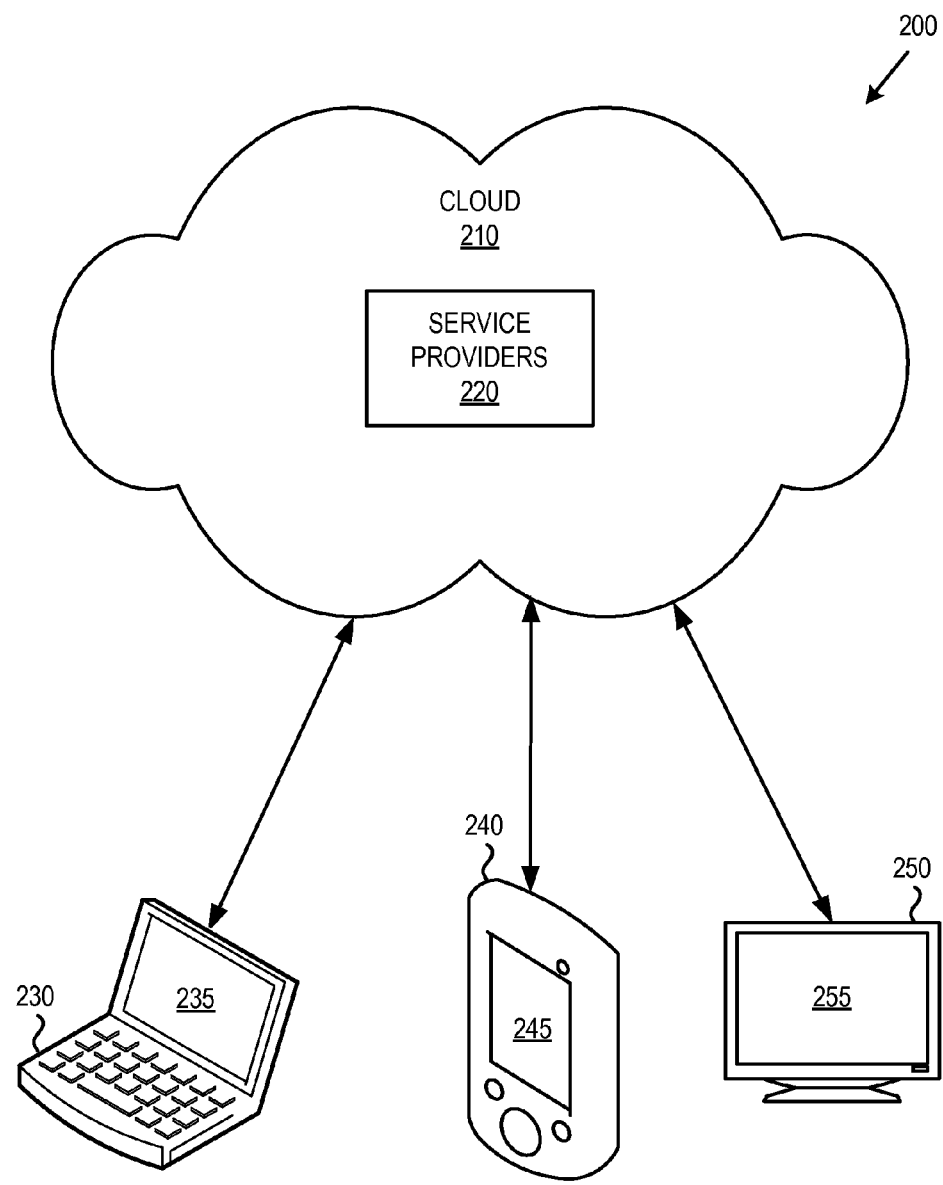
FIG. 2 illustrates a generalized example of a suitable implementation environment in which described embodiments, techniques, and technologies may be implemented.

FIG. 2 illustrates a generalized example of a suitable implementation environment 200 in which described embodiments, techniques, and technologies may be implemented. In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., processing user input and presenting a user interface) can be performed on local computing devices (e.g., connected devices 230, 240, 250) while other tasks (e.g., storage of data to be used in subsequent processing) can be performed in the cloud 210.

In example environment 200, the cloud 210 provides services for connected devices 230, 240, 250 with a variety of screen capabilities. Connected device 230 represents a device with a computer screen (e.g., a mid-size screen 235). For example, connected device 230 could be a desktop, laptop, notebook, netbook or tablet computer or the like. Connected device 240 represents a mobile computing device with a mobile computing device screen 245 (e.g., a small-size screen). For example, connected device 240 could be a mobile phone, smartphone, personal digital assistant or the like. Connected device 250 represents a device with a large screen 255. For example, connected device 250 could be a television with Internet connectivity, or a television connected to another device capable of connecting to the cloud such as a set-top box, gaming console or the like. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touch screen capability of a particular connected device (e.g., connected devices 230, 240, 250). Services that can be provided by the service providers 220 include, for example, email, Short Message Service (SMS), Multimedia Message Service (MMS), VoIP services, social networking and website hosting. The service providers can host online marketplaces offering wide varieties of goods and services such as software applications (e.g., VoIP applications) and upgrades and media content which can be obtained by users with or without purchase and for download from the cloud or delivery through postal mail.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

Figure 3:
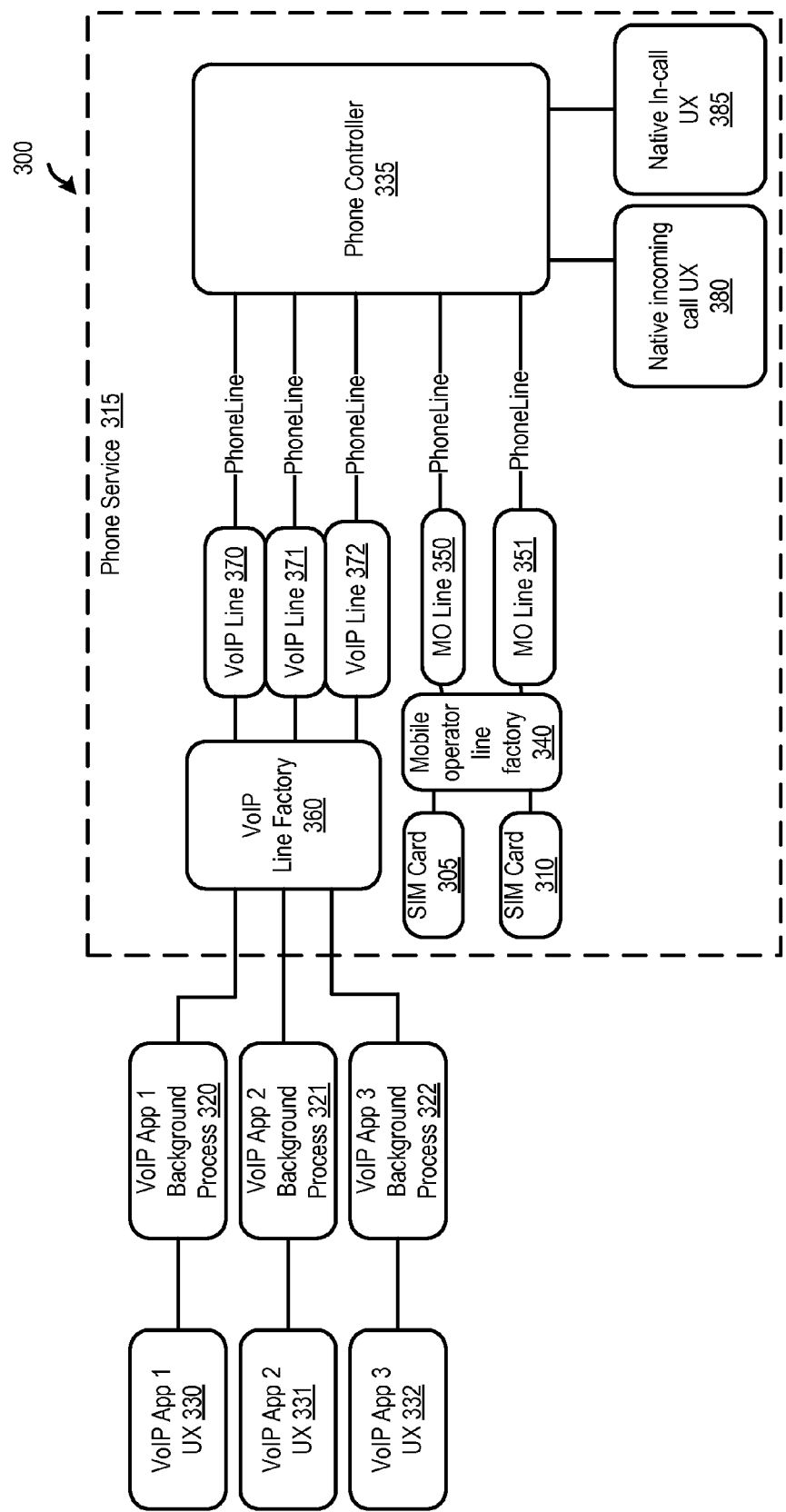
FIG. 3 is a block diagram of an exemplary architecture for providing a unified user experience for mobile calls.

FIG. 3 is a block diagram of an exemplary architecture 300 for providing a unified user experience for calls associated with three installed VoIP applications (VoIP Apps 1-3) and calls carried by mobile network operators (MO) associated with SIM cards 305 and 310. The architecture comprises a phone service 315 that implements a PhoneLine object for each line. There is one line for a VoIP application and one line associated with a SIM card. A VoIP application can support more than one login (such as one login for a personal account and a second login for a work account), but the VoIP application need not expose information regarding multiple logins to the phone service 315. That is, VoIP applications can manage multiple accounts or calls within the application but present a single call to the phone service 315. The VoIP application background processes 320-322 are able to receive incoming call notifications in order to receive and initiate calls, and are able to process a call when the VoIP application is not in the foreground. Accordingly, a VoIP application receives its own set of notifications and has background agents that act when such notifications are received.

The VoIP applications have VoIP application background processes 320-322 that interact with VoIP in-application user experiences (UXs) 330-332. The VoIP user experiences provide the user interfaces (a user experience comprises one or more user interfaces) presented at a mobile device display when a VoIP application is in the mobile device focus, that is, in the foreground. The in-application user experience provided by the VoIP application includes an in-call user experience that is presented when the mobile device is hosting one or more VoIP calls associated with the VoIP application, and the VoIP application is in the foreground. The in-application user experiences 330-332 are separate from a native incoming call user experience 380 that is callable by the phone controller 335. The native incoming call user experience 380 can be used for presenting an incoming call user experience for VoIP calls associated with installed VoIP applications and for calls associated with mobile operators whose networks the mobile device can gain access to. A VoIP application notifies the phone controller 335 of an incoming call and of its desire to invoke the native incoming call user interface via the VoIP line factory 360. By invoking the same native incoming call user interface for both types of calls a user is presented with a similar experience for both types of calls. Using the native incoming call user interface to answer VoIP calls also enables the ability to answer VoIP calls while the mobile device is locked and the ability to switch between VoIP calls and other calls in manners described herein.

Typically, a mobile device can host multiple calls simultaneously. The hosted calls comprise an active call and one or more inactive calls. The mobile device outputs the audio and/or video streams of the active call. The inactive calls are on hold and do not have their audio or video streams output at the mobile device. A user interface associated with the active call is presented at a mobile computing device display. If the active call is a VoIP application and the associated VoIP application is in the foreground of the mobile computing device, the user interface presented to the user can be part of an in-call user experience provided by the VoIP application. If the active call is not associated with a VoIP application, the user interface presented at the mobile device display can be part of an in-call user experience managed by the mobile computing device operating system. Typically, when a mobile computing device is simultaneously hosting multiple calls, a user interface that takes up a portion of the mobile device display, a reduced call user interface, is presented that is associated with one or more of the inactive calls. The architecture 300 further comprises a mobile operator line factory 340 that can create N mobile operator PhoneLine objects (e.g., MO lines 350-351), and a VoIP line factory 360 that can generate N VoIP PhoneLine objects (e.g., VoIP lines 370-372). The architecture 300 additionally comprises the native incoming call user experience 380 and a native in-call user experience 385. The native incoming call user experience 380 and the native in-call user experience 385 are callable by the phone controller 335. The native in-call user experience 385 manages presentation of the reduced call user interface when the mobile device is hosting multiple calls or hosting a single VoIP call and the associated VoIP application is not in the foreground, such as when a user has navigated away from the VoIP application or when the VoIP call is being hosted while the mobile device is in a locked state. The native user experiences 380 and 385 can be exposed to the VoIP applications and the phone controller 335 via APIs. The native incoming call user experience 380 provides for a rich incoming call user experience. For example, the native incoming call user experience 380 can provide a user with the ability to answer or ignore calls, answer an incoming VoIP call as an audio-only call, and answer VoIP calls while a mobile device is locked.

Table 1 shows an exemplary call flow between two users of mobile computing devices capable of performing the unified user experience methods described herein. The caller and callee columns show the events that occur at each party's mobile device during different phases of the call.

TABLE 1

Exemplary Call Flow

| Caller | Callee |
|---|---|
| Caller initiates a VoIP call to callee via a VoIP application. Caller's mobile device initiates call setup. | Callee does not know that the caller is about to call. Call notification is received at callee's mobile device. Incoming call user interface not yet shown. |
| Caller's mobile device performs media negotiation. | Caller's mobile device performs media negotiation. |

TABLE 1-continued

Exemplary Call Flow

| Caller | Callee |
|---|---|
| Caller's mobile device waiting for notification that callee has answered the call. Caller navigates away from VoIP application. Reduced call user interface shown. Video stream of VoIP call halted, but audio stream continues. Caller toggles speakerphone feature. Caller receives an incoming call not associated with the VoIP application installed on the mobile device. The VoIP call is uninterrupted while the incoming call user interface is displayed. | Incoming call user interface shown at callee's mobile device. Callee accepts call. Callee stops receiving video stream, but continues to receive audio stream. |
| Caller accepts incoming call. VoIP call put on hold. Reduced call user interface displayed corresponding to VoIP call on hold. | VoIP call put on hold. Audio stream stops. Callee does not receive video or audio streams. |
| Caller taps on reduced call user interface to swap active call. VoIP call is made the active call, and the call not associated with an installed VoIP application is made the inactive call. | Video and audio streams for the VoIP call resumes. VoIP call comes to the foreground. |
| Caller ends call. | Call is ended. |

A first phase in a VoIP user experience for a callee is the presentation of an incoming call user interface at a mobile computing device display.

In some embodiments, when a VoIP application background agent receives an incoming call notification, the VoIP application invokes the native incoming call user experience with a set of parameters that causes the mobile device to display an incoming call user interface for the incoming call. If the invocation is not successful, a failure condition can be returned to the VoIP application and the application can communicate the call rejection through its own service network. Reasons for failure of an incoming call user interface to be presented include, for example, inability to access audio/video resources needed for the call or another incoming call user interface is already being displayed.

A VoIP background agent can be capable of revoking the incoming call user interface request in situations such as, for example, when the caller hangs up before the call is answered or the called party answers the call at another end point. An incoming call user interface can be displayed for a specified amount of time, as described below. While the incoming call user interface is displayed, the user can tap on call buttons in the user interface to answer or ignore the call, and the phone service can inform the VoIP application of the user selection (e.g., ignore, answer, answer with audio only) or whether the incoming call user interface has timed out.

If a user selection is to answer the call, the VoIP application's foreground application is launched and the user is taken to an in-call user experience provided by the VoIP application. In some embodiments, if the device is locked, the in-call experience is provided by the operating system's native in-call experience.

A mobile device capable of performing the methods described herein can handle simultaneous VoIP calls, but multiple calls associated with different VoIP applications typically cannot exist. For example, the disclosed technologies can support multiple VoIP calls associated with a particular VoIP application, but cannot simultaneously support a first VoIP call associated with a first VoIP application and a second VoIP call associated with a second VoIP application. In some embodiments, when a first VoIP call associated with a first VoIP application is in progress and the mobile device receives a second incoming VoIP call associated with a second VoIP application, answering the second VoIP call results in the first VoIP call being terminated.

Figure 4:
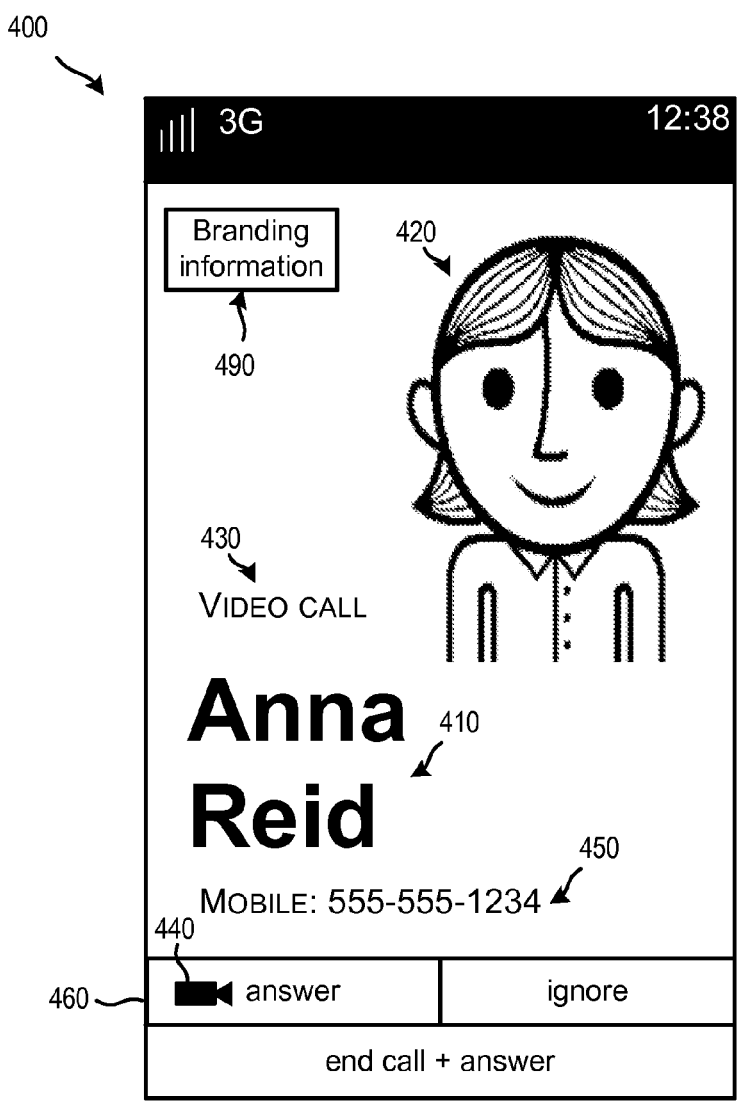
FIG. 4 shows an illustration of an exemplary incoming call interface presented as a result of a VoIP application invoking a native incoming call user interface.

FIG. 4 shows an illustration of an exemplary incoming call user interface 400 presented as a result of a VoIP application invoking the native incoming call user interface with parameters comprising information associated with a VoIP incoming call. Table 2 lists exemplary incoming call user interface parameters that can be supplied to a native incoming call user interface. In some embodiments, if the native incoming call user interface does not receive the required parameters, an incoming call user interface is not shown and a failure notice is returned to the calling VoIP application. Table 2 shows only one exemplary set of parameters for an incoming call user interface. In other embodiments, a native incoming call user interface can support more or fewer parameters than those shown in Table 2 and some parameters indicated as required can be optional and vice versa.

TABLE 2

Exemplary Incoming Call User Interface Parameters

| Parameter (FIG. 4 reference number) | Required/ Optional | Notes |
|---|---|---|
| Caller name (410) | required | |
| Caller picture (420) | optional | The caller picture can be an image associated with the caller stored at the callee's mobile device. |
| Has video (Boolean) | required | If true, call modality text 430 (e.g., "video call") and call modality video icon 440 can be shown. If false, call modality text 430 can read "audio call" and the call modality icon 440 is an audio icon, or no icon is displayed. |
| Source number (450) | optional | Caller's phone number. In some embodiments, additional information can be displayed, such as information about members of a group if the incoming call is a group call. |
| On behalf of (not shown) | optional | This field can be used in the case of a forwarded incoming call or in the case of a delegate scenario, such as when the user receiving the call is specified as a delegate of the person for whom the call was originally meant. The text "On behalf of: <string>" can be displayed if this field is provided, with the <string> being information supplied by the VoIP application. |

TABLE 2-continued

Exemplary Incoming Call User Interface Parameters

| Parameter (FIG. 4 reference number) | Required/ Optional | Notes |
|---|---|---|
| Answer button (460) | required | Indicates whether the "answer" call button is to be presented. The VoIP application can provide a URI (uniform resource identifier) that the phone service invokes if the user taps on the "answer" button. If the phone is not locked, the in-application user experience of the VoIP application can be invoked. |
| Branding information (490) | required | The branding information can comprise any branding information associated with the VoIP application, such as the VoIP application's logo or text. |
| Path to ringtone | optional | The ringtone specified by the application can be played when the incoming call user interface is displayed as long as the user has not assigned a custom ringtone to the caller's contact. If a custom ringtone has been assigned, the custom ring tone is played instead. If the ringtone provided by the application is invalid, a default ringtone for cell calls can be used instead. If another call is already in progress, a default call waiting tone can be played. |
| Ringtone duration | optional | Ring the call for the specified duration before dismissing the user interface and returning a timeout status to the calling agent. If a ringtone duration is not provided, or does not lie within the specified range, a default value (e.g., 30 seconds) can be used. VoIP applications can be made capable to adjust ringtone duration in order to preserve battery life. For example, the VoIP application can detect a power state of the mobile device (e.g., the mobile device is connected to a power supply, is running on battery power, has an estimated battery life below a specified threshold) and specify a ringtone duration accordingly. For example, a VoIP application can be capable of providing a longer ringtone duration when the mobile device is connected to a power supply, a shorter ringtone duration when the mobile device is running on battery power, and an even shorter ringtone duration if the estimated remaining battery life is less than, for example, 20%. |
| TTS (text to speech) call announcement | optional | In some embodiments, ease of access settings on the mobile device can include the ability to announce the incoming call and the caller's name using TTS. The strings used for VoIP calls can be as follows:<br>VoIP audio calls: "Call from <caller name>"<br>VoIP video calls: "Video call from <caller name>"<br>Cell calls (for reference): "Call from <caller name>" |

In some embodiments, the native incoming call user interface shows either the "answer" and "ignore" buttons, or the "answer," "ignore" and "end call+answer" buttons, depending on whether a call is already in progress when the incoming call is received. In the case where a mobile device is locked or the screen is turned off, the user can be made to slide or swipe away the extra incoming call user interface screen before exposing a user interface comprising the "answer," "ignore" and "end call+answer" call buttons in order to guard against unintended and accidental taps. A mobile device can be locked by a simple lock or password-locked. A simple lock can be unlocked by a user making a simple gesture, such as a single sliding or swiping gesture, on the mobile device touchscreen. A password-locked screen can be unlocked by a user entering the proper numeric code (such as a PIN), alphanumeric code, unlock pattern (e.g., dots displayed in a grid pattern connected in the proper sequence) or other password supplied in any another fashion.

The "answer" button in the incoming call user interface answers the incoming call. Upon answering the call, the corresponding VoIP application is brought to the foreground (if the mobile device is unlocked), and an in-call user experience provided by the VoIP application is presented. As a result of accepting the incoming call, one or more calls already in progress may get disconnected, as discussed below. In some embodiments, if the mobile device is Bluetooth-enabled, the call can be answered using a Bluetooth device that is communicatively coupled with the mobile device. In some embodiments, answering a call with a Bluetooth device causes only the audio stream to be provided to the device and the video stream may or may not be displayed at the mobile device. The "ignore" button rejects the incoming call, dismisses the incoming call user interface, and the associated VoIP application is not brought to the foreground.

The "end call+answer" button appears when there is at least one other call already in progress when an incoming call is detected. This button provides a user with the option to end the current call when the incoming call is answered. In some embodiments, the "end call+answer" button can be excluded from the incoming call user interface when two or more calls are in progress or when a VoIP call is already in progress and the incoming call is a VoIP call associated with a different VoIP application from the one associated with the VoIP call already in progress.

Although FIG. 4 shows a graphical illustration of an incoming call user interface, an incoming call user interface is not limited to visual components. The user interfaces described herein can include audio components as well. For example, the native incoming call user interface can include an audio ringtone and the reduced call user interface can include an audio alert that is played periodically or on another time basis to remind the user that there is a call on hold.

Figure 5C:
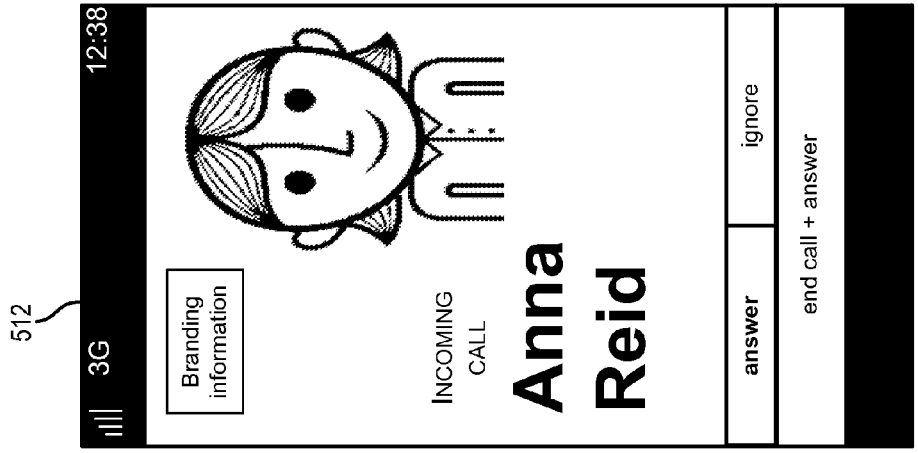
FIGS. 5(a)-5(c) show illustrations of exemplary incoming call user interfaces.
Figure 5B:
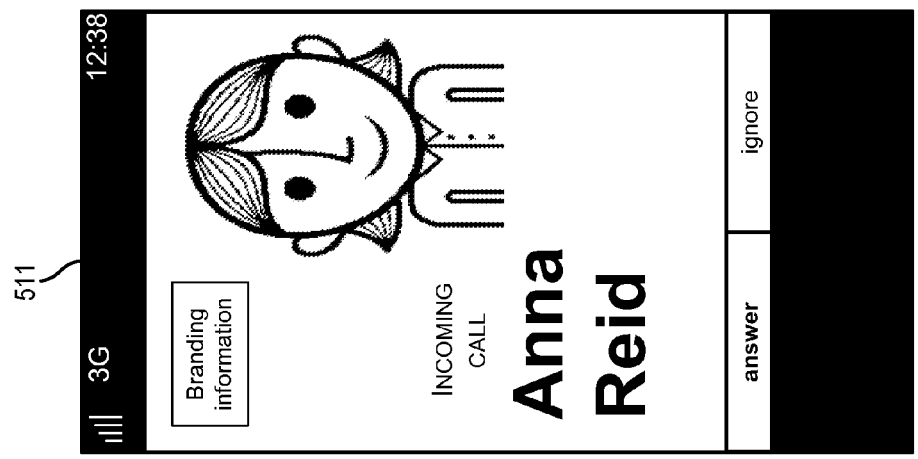
Figure 5A:
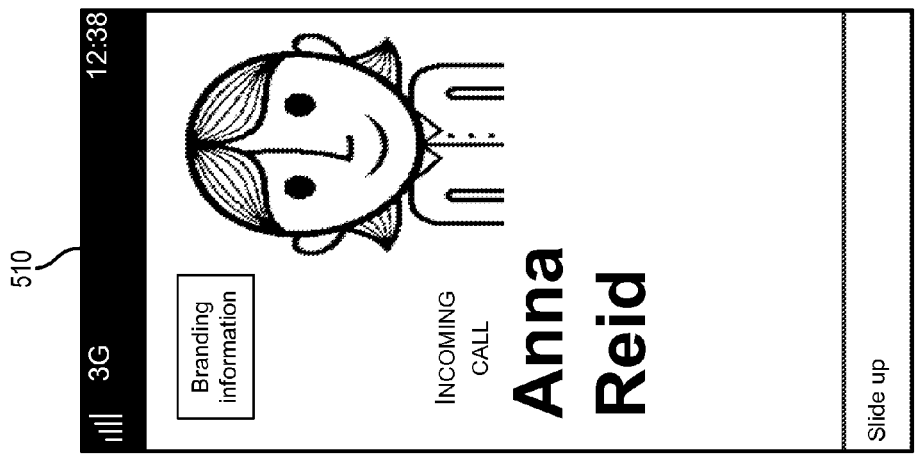

FIGS. 5(a)-5(c) show illustrations of exemplary incoming call user interfaces. FIG. 5(a) illustrates a user interface 510 that can be displayed when a mobile device is locked (password-locked or simple-locked). The user interface 510 is a "slide up" screen that prompts the user to supply a vertical swiping gesture before the call buttons are displayed. In other embodiments, any other simple gesture can be asked of the user before displaying the call buttons, such as a horizontal swipe.

When the user has applied the appropriate unlocking gesture to user interface 510, user interface 511 or 512 can be displayed, depending on whether other calls are in progress. If no other calls are in progress, user interface 511 is displayed, in which only the "answer" and "ignore" call buttons are displayed. If the user selects the "answer" button, the call is answered. Selecting the "ignore" button causes the incoming call to be rejected.

If the call in progress is a VoIP call associated with a VoIP application that is different from the VoIP application associated with the incoming call, the user interface 511 can be displayed. Selecting the "answer" button ends the existing call and answers the incoming call, and selecting of the "ignore" button rejects the incoming call.

The user interface 511 can also be displayed if two or more calls of any kind are already in progress when an incoming call is received. In this case, selecting the "answer" button answers the incoming call and drops one or more of the existing calls. In some embodiments, if any of the calls in progress are VoIP calls corresponding to a VoIP application different from the VoIP application associated with the incoming call, such calls are disconnected. The remaining calls, if any, remain hosted by the device, and the incoming call becomes the active call. Otherwise, the existing call is disconnected and the incoming call becomes the active call. Selecting the "ignore" button rejects the incoming call.

If a call is in progress, and the existing call is a VoIP call associated with the same VoIP application as the one associated with an incoming VoIP call, or the existing call is not a call associated with a VoIP application, user interface 512 can be displayed. Selecting the "answer" button answers the incoming call and puts the existing call on hold, selecting the "ignore" button ignores the incoming call, and selecting the "end call+answer" button ends the existing call and answers the incoming call.

FIGS. 6-8 show exemplary incoming call user experiences depending on whether the mobile device screen is locked when an incoming call is detected.

Figure 6C:
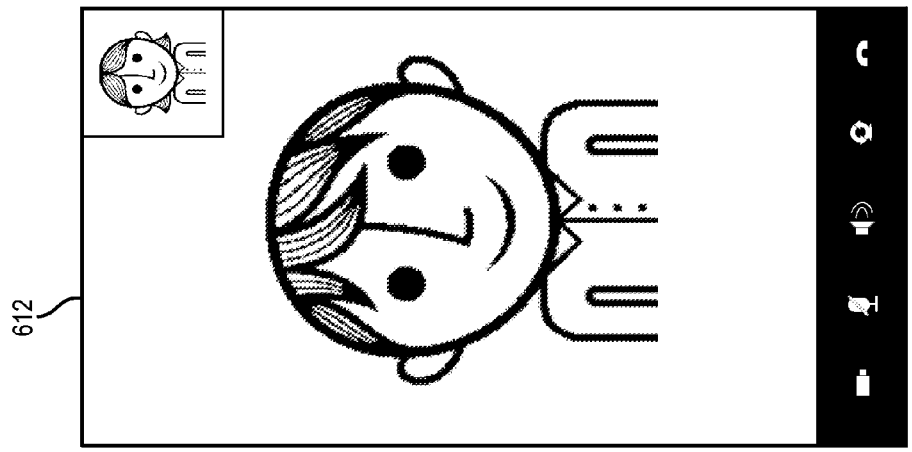
FIGS. 6(a)-6(c) show illustrations of user interfaces of an exemplary incoming call user experience presented when a mobile computing device is unlocked.
Figure 6B:
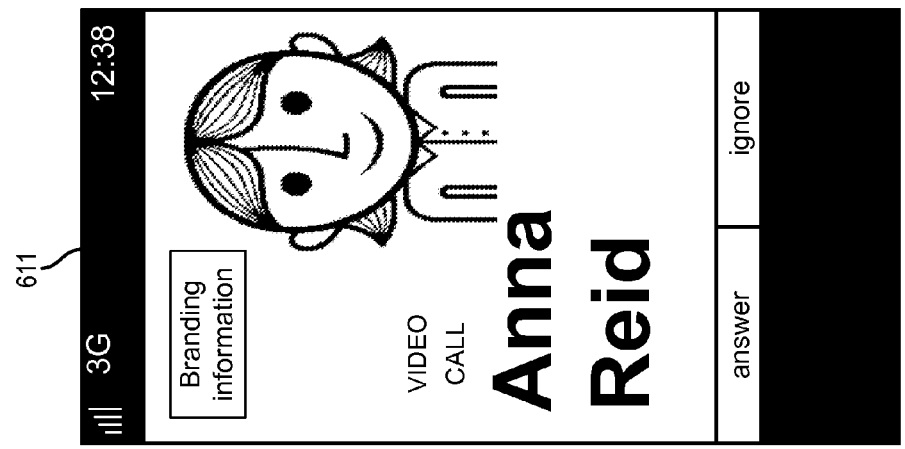
Figure 6A:
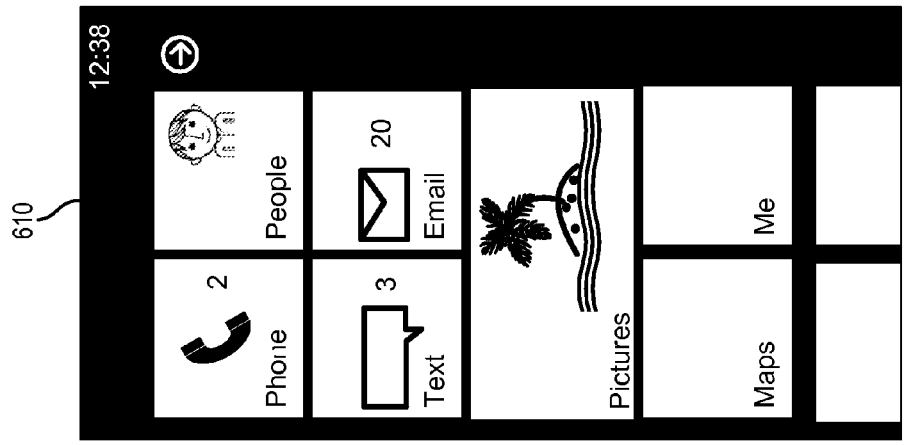
Figure 7D:
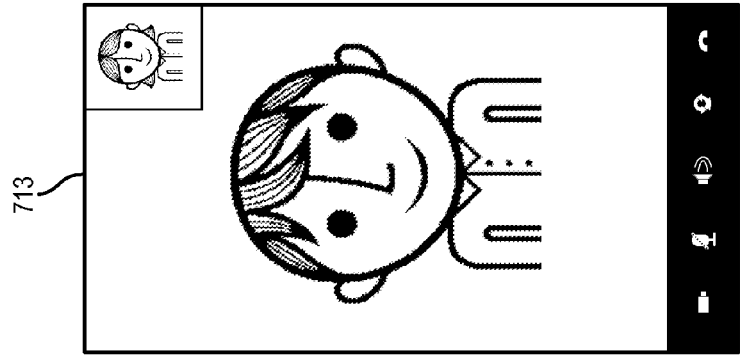
FIGS. 7(a)-7(d) show illustrations of user interfaces of an exemplary incoming call user experience presented when a mobile computing device is locked, but not password-locked.
Figure 7C:
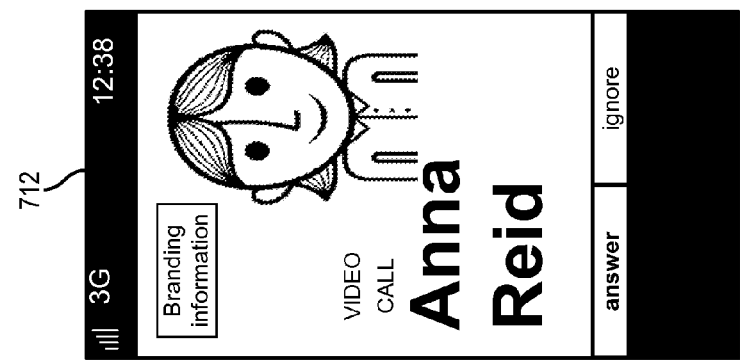
Figure 7B:
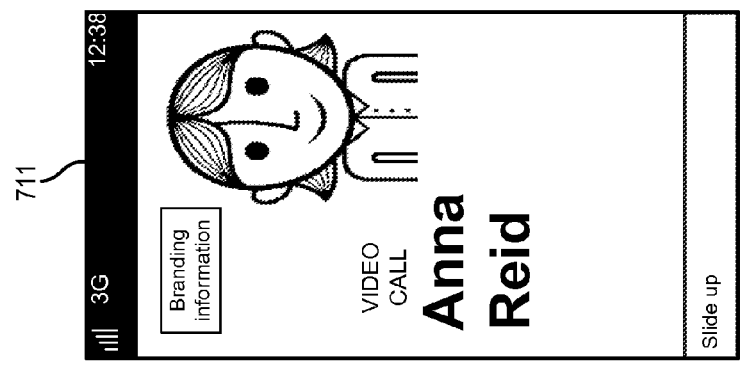
Figure 7A:
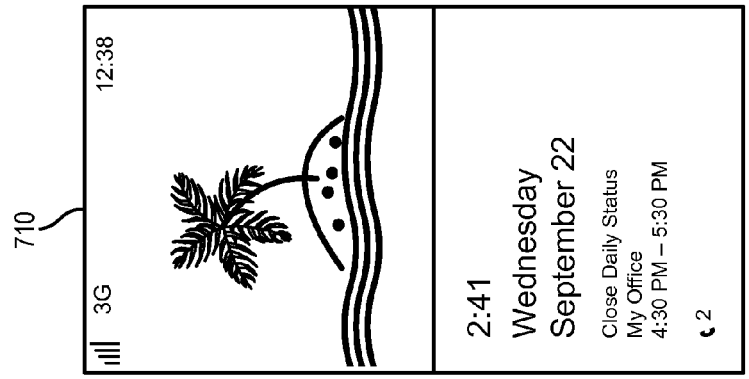

FIGS. 6(a)-6(c) show illustrations of user interfaces of an exemplary incoming call user experience presented when a mobile computing device is unlocked. The user interface 610 is a home screen of the mobile device and shows the mobile device with the display turned on and in an unlocked state. When an incoming call is received, the user interface 611 can be displayed. The user interface 611 obscures the previous foreground user experience, and presents the user with the options to answer or ignore the call. The user can answer the incoming call by tapping the "answer" button.

If the user taps the "ignore" button, the incoming call user interface 611 is dismissed and whatever was previously in the foreground (e.g., application, home screen, etc.) returns to the foreground. In some embodiments, if an application is executing when an incoming call is received, the incoming call causes the foreground application to be paused. The state of the foreground application is saved when the incoming call is received, and the saved state is restored if the incoming call is ignored or when the call ends. Accepting the call causes the mobile device to navigate to the VoIP application and can push the application previously running in the foreground onto the back stack, a data structure that keeps track of the order in which applications are executed on the mobile device.

FIGS. 7(a)-7(d) show illustrations of user interfaces of an exemplary incoming call user experience presented when a mobile computing device is locked, but not password-locked. The user interface 710 is an exemplary user interface that can be presented while the mobile device is in a locked state, but is not password-locked. The mobile device screen could be password-locked for various reasons, such as because the screen was turned off. When an incoming call is detected, the user interface 711 is displayed, indicating that the user is to apply a "slide up" or other gesture to unlock the screen before the call buttons are displayed. After the user applies the appropriate gesture, the user interface 712 is displayed, showing the "answer" and "ignore" call buttons. Once an incoming call has been answered, the mobile device navigates to the VoIP application, which presents the VoIP in-call user experience, which can comprise the user interface 713. Typically, the act of sliding up an incoming call screen that is presented while the mobile device is locked is interpreted as intent by the user to unlock the phone. Accordingly, if a user chooses to ignore an incoming call, the mobile device can return to the locked screen user interface 710.

FIGS. 8(a)-8(e) show illustrations of user interfaces of an exemplary incoming call user experience presented when a mobile computing device is password-locked. The user interface 810 is a sample screen of a mobile device in a password-locked state. When an incoming call is detected, the user interface 811 can be displayed, indicating that the user is to apply a "slide up" gesture to cause the "answer" and "ignore" call buttons to be displayed. After the user applies the appropriate gesture, the user interface 812 is displayed. On selecting answer, the call is accepted, the audio stream of the incoming call is output and the user interface 813 is presented. The user supplies the appropriate password to access the VoIP application's in-call user experience.

The user interface 813 comprises a reduced call user interface 820, a password entry user interface 821 and lock screen wallpaper 822. The reduced call user interface 820 can be shown at the top of the screen as shown, but could appear anywhere else on the mobile device screen. The user interface 820 contains the text "Unlock to Expand," prompting the user to enter the password via the password entry user interface 821 in order to access the VoIP application in-call user experience. The password entry user interface 821 is a keypad in FIG. 8(d), but alternatively could be an alphanumeric keyboard or a keyboard comprising any other type of characters, an array of dots which the user connects in a specific pattern, or any other arrangement of user interface elements that allow a user to unlock a password-protected mobile device. If the incoming call is a video call, the audio stream is output at the mobile device but the video stream is not output at the device. Thus, in addition to gaining access to call controls such as speakerphone and muting, entering the proper password allows the user to gain access to the video component of a VoIP call. Pressing a back button 823 dismisses the password entry user interface 821.

The technologies described herein support Emergency Call Back Mode (ECBM), a mode supported on CDMA networks that prevents calls and text messages from taking place for a specified period of time after an emergency call has been made from a mobile device. The intent is to keep the channel used for the emergency call free in order to receive a call back from the emergency number. In some embodiments, an indication is provided at the mobile device display that the mobile device is in EBCM and that the user is allowed to manually dismiss ECBM in order to engage in calls and text messages again. If the EBCM notice presented in the user interface is not dismissed manually, it can dismiss after the ECBM times out.

For incoming VoIP calls, if the mobile device is in ECBM, the phone service returns a busy status. In some embodiments, outgoing call behavior is not affected by ECBM because the user is unable to navigate to the VoIP application without dismissing ECBM. Calls that are already in progress when the mobile device enters ECBM, whether a VoIP call associated with an installed VoIP application or a call not associated with an installed VoIP application, are not disconnected as they do not occupy the channel that was used to place the emergency call.

FIGS. 9(a) and 9(b) show illustrations of exemplary user interfaces presented when a call is switched between being active and inactive. FIG. 9(a) shows an exemplary VoIP application in-call user interface 910 that can be displayed when a VoIP call is an active call. The user interface comprises video 911 of the other party to the call, and a smaller window 912 shows video of the mobile device user. When a VoIP call is in progress and the VoIP application associated with the call is the foreground application, the VoIP application has access to resources and control over how the call experience looks and behaves. For example, the VoIP application has access to call controls such as mute, speakerphone and routing the audio component to a Bluetooth device.

When the user navigates away from the VoIP application, the VoIP application user experience is dismissed, video streams associated with the VoIP call are suspended, and the audio stream survives. User interface 920 is an interface that can be displayed after a user navigates from a VoIP application to a mobile device home screen. The user interface 920 comprises a reduced call interface 921 at the top of the display that presents information associated with the VoIP call that has been moved to the background. The reduced call interface 921 comprises the call duration, information about the VoIP application (such as the VoIP application name, e.g., Skype™) and the name of the other party to the call (e.g., Miles Reed). The reduced call interface 921 can also operate as entry point back to the full in-call VoIP application user experience. For example, tapping on the reduced call interface 921 can cause the VoIP application associated with the VoIP call to move to the foreground, and the VoIP application user interface 910 can be presented at the mobile device display. While the VoIP application is in the background, the background call agent can be responsible for sending and receiving audio streams.

As shown in FIG. 8(d), a reduced call user interface can be displayed when an incoming VoIP call is accepted while a mobile device is password-locked. In this situation, when the incoming call is answered, the VoIP call is connected, but the VoIP application in-call user experience is not presented to the user. Thus, the mobile device treats the incoming call as if it is in the background and provides a reduced call user interface.

A reduced call user interface can contain information different from or in addition to that shown in the reduced call user interface shown in FIG. 9(b). For example, if the call associated with the reduced call user interface has been placed on hold, the text "ON HOLD" can be displayed in the reduced call user interface. The "ON HOLD" text can be shown in place of or in addition to the call duration in the reduced call user interface. Secondary text can be presented in the reduced call user interface as well. For example, secondary text can provide a visual hint to the user for an action that can be taken. For instance, when a VoIP call is the active call and a reduced call user interface is displayed while the mobile device is locked, the reduced call user interface can comprise the text "UNLOCK TO EXPAND." Secondary text can be displayed in addition to or in place of other information presented in the reduced call user interface, or, the information displayed in the reduced call user interface can periodically toggle between the secondary text and other information. In some embodiments, if a single call is in progress, the secondary text "TAP TO EXPAND" can be displayed and if multiple calls are in progress, the secondary text "TAP TO SWAP" can be displayed.

In some embodiments, the phone service can display the reduced call user interface when the associated VoIP application goes into the background and does not show the reduced call user interface when the VoIP application is in the foreground. Typically, the phone service does not monitor the in-call user experiences provided by VoIP applications. As a result, when a VoIP call is in progress and the user navigates away from a VoIP application user interface that presents the full-screen video of the other party to another user interface of the VoIP application, the VoIP application is responsible for presenting an indication that a VoIP call is in progress and providing a way for the user to return to the VoIP application's full-screen video user interface.

Figure 10:
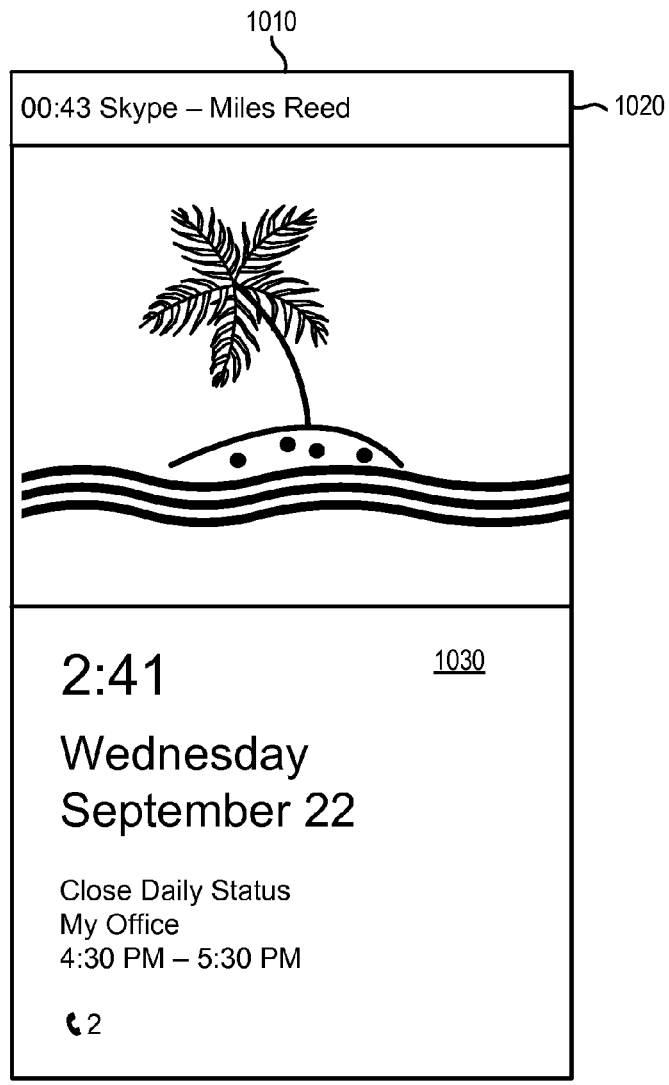
FIG. 10 shows an illustration of an exemplary user interface that can be presented when a mobile device is password-locked.
Figure 12A:
FIGS. 12(a)-12(d) show illustrations of exemplary user interfaces presented as part of an incoming call user experience when a locked mobile computing device that is not password-locked is already hosting a VoIP call and receives a second incoming VoIP call associated with the same VoIP application as the already existing VoIP call.
Figure 12B:
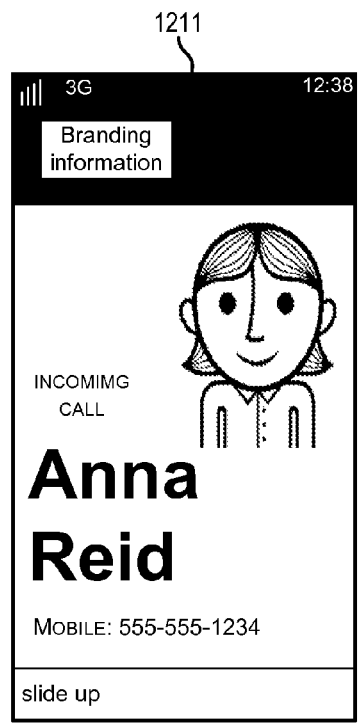
Figure 12C:
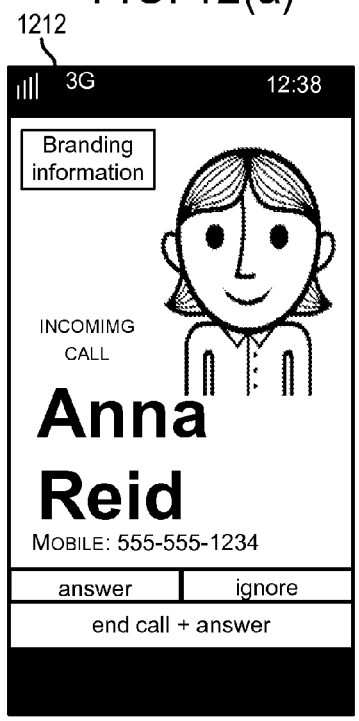
Figure 12D:
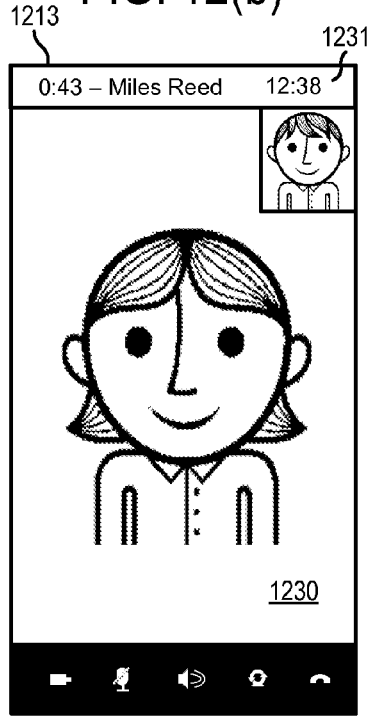
Figure 14A:
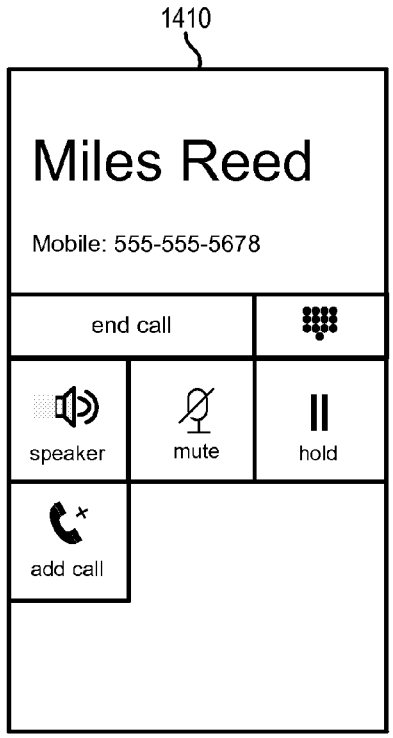
FIGS. 14(a)-14(d) show illustrations of exemplary user interfaces presented as part of an incoming call user experience when a locked mobile computing device that is not password-locked and is already hosting a call not associated with a VoIP application receives an incoming VoIP call.
Figure 14B:
Figure 14C:
Figure 14D:
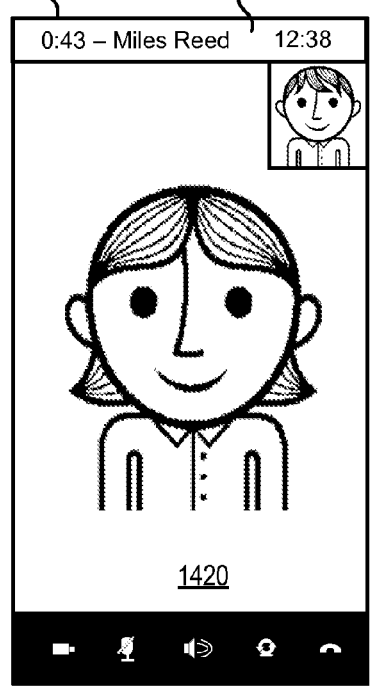
Figures 15A, 15B, 15C:
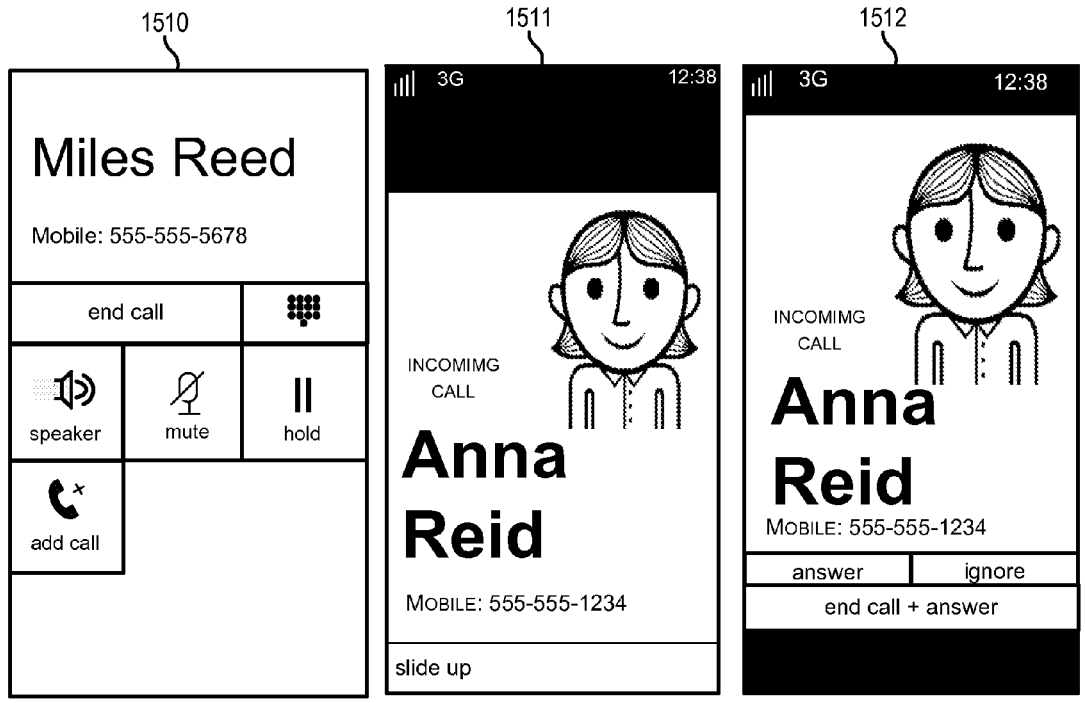
FIGS. 15(a)-15(e) show illustrations of exemplary user interfaces presented as part of an incoming call user experience when a password-locked mobile computing device is hosting an existing call not associated with a VoIP application and receives an incoming VoIP call.
Figures 15D, 15E:
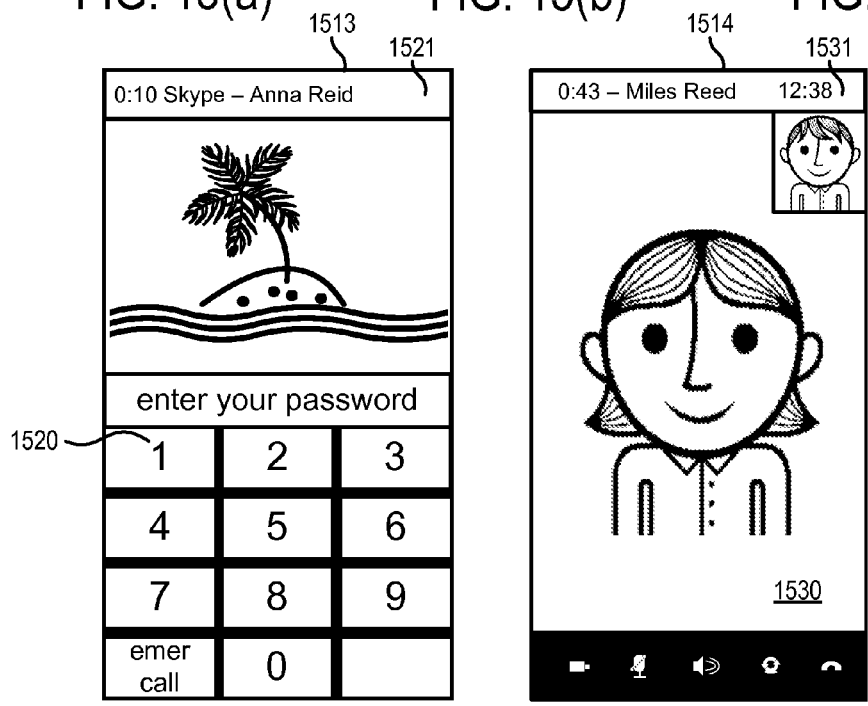

FIG. 10 shows an illustration of an exemplary user interface presented when a mobile device is password-locked. The user interface 1010 comprises a reduced call user interface 1020 shown at the top of a lock screen 1030. Tapping on the reduced call user interface 1020 does not result in the user being taken to an in-call user experience. Unlocking the device can take the user to the previous foreground experience. In some embodiments, if a user taps on the reduced call user interface 1020 before unlocking the display, the VoIP application becomes the foreground experience underneath the lock screen, and the in-call user experience managed by the VoIP application is presented upon unlocking of the device.

The technologies described herein can provide a unified user experience for multiple calls being simultaneously hosted by a mobile device. In one embodiment, a mobile device can simultaneously host multiple calls according to at least the following rules. First, at most two calls of any kind (e.g., associated with a VoIP application, not associated with a VoIP application) can be hosted at a time, although either or both calls can be on hold. Second, there can be only one call active at a time. That is, the audio stream (and, optionally, the video stream) of only one call can be output at the mobile device. Third, if two or more VoIP calls are being hosted, they are to belong to the same VoIP application. For example, two Skype™ calls can be simultaneously hosted, but a mobile device cannot simultaneously host a Skype™ call and a VoIP call associated with another VoIP application. Fourth, an incoming call user interface is to be presented (or attempted to be presented) for every incoming call. In some instances, accepting an incoming call can result in an existing call being dropped. For example, if a first VoIP call associated with a first VoIP application is in progress, and the incoming call is a VoIP call associated with a second VoIP application, answering the incoming call can result in the first VoIP call being terminated. Fifth, when multiple calls are in progress and the active call ends, the inactive call does not automatically become the active call, unless both calls are both GSM (Global System for Mobile Communications) calls as dictated by the GSM standard. Thus, in this embodiment, the set of possible calls that can be hosted by a mobile device at any given time is: no calls, one call (a VoIP call associated with a VoIP application or a call not associated with a VoIP application), one VoIP call associated with an installed VoIP application and a call not associated with a VoIP application, two calls not associated with installed VoIP applications, or two VoIP calls associated with the same VoIP application. The following discussion discusses how various multiple call scenarios are handled according to this set of exemplary rules.

If a call not associated with a VoIP application is in progress and a mobile device receives an incoming VoIP call, the mobile device can display an incoming call user interface with "answer," "ignore" and "end call+answer" call buttons, such as the incoming user interface 512 shown in FIG. 5(c). If the user selects the "answer" button, the existing call is put on hold and the incoming VoIP call becomes the active call. If the user selects the "end call+answer" button, it ends the call in progress and answers the VoIP call, which becomes the active call. If the user chooses to ignore the call, the incoming call user interface is dismissed and the new call is not connected.

If a call not associated with an installed VoIP application is already in progress and the user initiates a VoIP call, the call in progress is put on hold (i.e., made an inactive call) and a reduced call user interface associated with the call on hold is presented. The VoIP call becomes the active call and the associated VoIP application becomes the foreground application.

If a VoIP call is already in progress and the mobile phone detects an incoming call that is not associated with an installed VoIP application, the mobile device can display an incoming call user interface with "answer," "ignore" and "end call+answer" buttons, such as the incoming user interface 512 shown in FIG. 5(c). If the user selects the "answer" button, the VoIP call is put on hold, and the incoming call becomes the active call. If the user selects the "end call+answer" button, the VoIP call is ended, the incoming call is answered and becomes the active call. If the user selects the "ignore" button, the incoming call user interface is dismissed and the incoming call is not connected. If a VoIP call is already in progress and the user places a call not associated with an installed VoIP application, the VoIP call is made inactive and put on hold, and a reduced call user interface associated with the VoIP call is presented. The call not associated with a VoIP application becomes the active call and the associated user experience comes into the foreground.

If a VoIP call is active and the phone detects an incoming VoIP call associated with the same VoIP application, the mobile device can display an incoming call user interface with "answer," "ignore" and "end call+answer" call buttons. If a user selects the "answer" button, the current VoIP call can be put on hold, and the incoming VoIP call can become the active call. If the user selects the "end call+answer" button, the active VoIP call is dropped, and the incoming VoIP call becomes the active call. If a user selects the "ignore" button, the incoming call user interface can be dismissed.

If a VoIP call is active and a new VoIP call is initiated by the user, the previously existing VoIP call can be put on hold and the new VoIP made the active call. The phone service can inform the VoIP application which VoIP call is to be treated as the active call, with the VoIP application assuming responsibility for making the indicated call the active call. A reduced call user interface provided by the mobile device's operating system (e.g., the reduced call shown in FIGS. 8(d), 9(b) and 10) does not appear for the previously active VoIP call, because the VoIP application is in the foreground. In this case, where a mobile device is simultaneously hosting two VoIP calls, the associated VoIP application provides its own user experience that provides the ability for a user to move between the two VoIP calls. When a user navigates away from the VoIP application, a reduced call user interface provided by the mobile device operating system can appear and the VoIP application moves into the background. Tapping on the operating system-provided reduced call user interface takes the user back to the VoIP application user experience and the reduced call user interface is dismissed.

If a VoIP call is active and an incoming VoIP call is detected that is associated with an installed VoIP application that is different from the VoIP application associated with the active call, upon answering the incoming call, the existing VoIP call can be disconnected and the incoming VoIP call can become the active call and move into the foreground. The option to answer the call without ending the current call can be excluded from the incoming call user interface as the user does not have a choice whether to hang up or not. If the user ignores the call, the incoming call user interface is dismissed and the new VoIP call is not answered.

If the active call is a VoIP call and a second VoIP call is initiated by the user, the existing VoIP call can be dropped. The phone service can inform the VoIP application associated with the existing VoIP call that the existing VoIP call is to be terminated. The VoIP application is responsible for disconnecting the previously existing VoIP call over its network. The second VoIP call becomes the active call.

If two calls are already in progress and the mobile device detects an incoming VoIP call, the mobile device manages the calls as follows. If the two calls are calls not associated with an installed VoIP application, are two VoIP calls associated with the same VoIP application, or consist of one call not associated with a VoIP application and a VoIP call associated with the VoIP application associated with the incoming VoIP call, the mobile device can present an incoming call with "answer" and "ignore" buttons. If the user selects the "answer" button, the currently active call is disconnected and the incoming call becomes the active call. If the user selects the "ignore" button, the incoming call user interface is dismissed and the incoming call is not connected. If the user attempts to initiate a new VoIP call with two calls already existing, the phone service can return an error indicating that the maximum number of calls has been reached.

If one call not associated with an installed VoIP application and one VoIP call associated with VoIP application that is different from the VoIP application associated with an incoming VoIP call are being simultaneously hosted, upon selecting the "answer" button on the incoming user interface, the existing VoIP call is disconnected regardless of whether it is currently the active call, because, in this embodiment, two VoIP calls from different apps cannot coexist. The incoming VoIP call becomes the active call. If the incoming call is ignored, the incoming call user interface is dismissed and the incoming VoIP call is not connected. In this scenario, the "end call+answer" button can be left out of the incoming call user interface.

If one call not associated with an installed VoIP application and one VoIP call are in progress and the user initiates a VoIP call, the existing VoIP call is dropped, regardless of whether it was currently the active call, and the new VoIP call becomes the active call.

In other embodiments, multiple calls can be hosted by a mobile device according to different rule sets. For example, alternative rules sets can allow a mobile device to simultaneously host more than two calls and/or allow simultaneous hosting of VoIP calls associated with the different VoIP applications. For instance, in a second embodiment, a mobile device can simultaneously host up to the three FIGS. 11-15 illustrate various scenarios in which the mobile device is simultaneously hosting two calls while the mobile device is in a locked state.

FIGS. 11(a)-11(e) show illustrations of exemplary user interfaces presented as part of an incoming call user experience when a locked mobile device (simple-locked or password-locked) is hosting a VoIP call and receives an incoming call not associated with a VoIP application. User interface 1110 comprises a lock screen 1120 and a reduced call user interface 1121 associated with the active VoIP call. When the incoming call is received, incoming call user interface 1111 is presented, indicating that the user is to supply a "slide up" gesture to gain access to a user interface that comprises the "answer," "ignore" and "end call+answer" call buttons. After the user supplies a slide up gesture (or other indicated gesture) user interface 1112 is presented, which comprises the "answer," "ignore" and "end call+answer" call buttons. Upon accepting the incoming call, the user interface 1113 is presented. The user interface 1113 is an in-call user interface 1130 presented for a call that is not associated with an installed VoIP application. The user interface 1113 comprises a reduced call user interface 1131 for the VoIP call. At this point, the VoIP call is the inactive call and the incoming call is the active call. The reduced call user interface 1131 provides an entry point to take the user back to the VoIP in-call experience presented when a mobile device is locked, which can include user interface 1114.

FIGS. 12(a)-12(d) show illustrations of exemplary user interfaces presented as part of an incoming call user experience when a locked mobile computing device that is not password-locked is already hosting a VoIP call and receives a second incoming VoIP call associated with the same VoIP application as the already existing VoIP call. User interface 1210 comprises a lock screen 1220 and a reduced call user interface 1221 associated with the existing VoIP call. When the incoming VoIP call is received, incoming call user interface 1211 is presented, indicating that the user is to supply a "slide up" gesture to gain access to user interface 1212 that presents the "answer," "ignore" and "end call+answer" call buttons. Upon accepting the incoming call, the user interface 1213 is presented. The user interface 1213 is an in-call user interface associated with and provided by the VoIP application. The user interface 1213 comprises an in-call user interface 1230 associated with the just-accepted VoIP call, which is now the active call, and a reduced call user interface 1231, which is associated with the previously existing VoIP call, which is now inactive.

FIGS. 13(a)-13(e) show illustrations of exemplary user interfaces presented as part of an incoming call user experience when a password-locked mobile computing device is already hosting a VoIP call and receives an incoming VoIP call associated with the same VoIP application as the existing VoIP call. The user experience begins with presentation of a user interface 1310 comprising a lock screen and a reduced call user interface for the existing VoIP call. Upon receiving the second call, the incoming call user interface 1311 is presented, which the user dismisses by applying a slide up gesture to access user interface 1312 comprising the call buttons. After accepting the second VoIP call, the user interface 1313 is presented, which comprises a keypad 1330 that allows the user to unlock the mobile device. The user interface 1313 further comprises a reduced call user interface 1331 that is associated with the second VoIP call. The reduced call user interface 1331 contains both VoIP calls in that tapping the user interface 1331 causes the mobile device to switch between the two VoIP calls as the active call. For example, the user interface 1331 is shown as being associated with the second VoIP call, the call with Anna Reid. If the user selects the user interface 1331, the call with Anna Reid is moved to the background and made the inactive call, and the audio stream output at the mobile device with be that of the originally existing VoIP call, the call with Miles Reed, which is made the active call. Upon receiving the correct numeric password via the keypad 1331, the mobile device navigates to the in-call user interface 1314 provided by the VoIP application associated with both calls. The user interface 1314 comprises the full in-call user interface 1340 and a reduced call user interface 1341 associated with the original VoIP call, the call with Miles Reed.

FIGS. 14(a)-14(d) show illustrations of exemplary user interfaces presented as part of an incoming call user experience when a locked mobile computing device that is not password-locked and is already hosting a call not associated with a VoIP application, receives an incoming VoIP call. User interface 1410 is an in-call user interface for a call that is not associated with an installed VoIP application that is presented when the mobile device is locked. Incoming call user interfaces 1411 and 1412 are similar to incoming call user interfaces 1111-1112, 1211-1212 and 1311-1312. Upon accepting the incoming VoIP call, the incoming VoIP call is made the active call, and user interface 1413 is presented, which comprises a VoIP application's in-call user interface 1420 and a reduced call user interface 1421. The reduced call user interface 1421 is associated with the original call, which is now the inactive call.

FIGS. 15(a)-15(e) show illustrations of exemplary user interfaces presented as part of an incoming call user experience when a password-locked mobile device is hosting a call not associated with a VoIP application and receives an incoming VoIP call. User interface 1510 is an in-call user interface for a call not associated with a VoIP application that is presented when the mobile device is locked. The incoming call user interfaces 1511 and 1512 are presented in response to the mobile device detecting the incoming VoIP call and the user supplying the slide up gesture to access the call buttons. After the call has been answered, user interface 1513 is presented, which comprises a keypad 1520 for unlocking the password-locked mobile device and a reduced call user interface 1521 associated with the existing call. After the device has been unlocked, user interface 1514 is presented, which comprises an in-call user interface 1530 provided by the VoIP application and a reduced call user interface 1531 associated with the previously existing call.

The VoIP applications are responsible for providing in-call user experiences for VoIP calls when the device is unlocked. The VoIP in-call user experience includes presenting controls for mute, speakerphone, etc. that can change the state of the VoIP call. VoIP applications can inform the phone service about changes in the state of a VoIP call and receive notifications from the phone service related to changes in the VoIP call state. This allows the user experiences provided by VoIP applications and the mobile device operating system to be consistent and to reflect the current state of a VoIP call.

Table 3 shows an exemplary set of actions that a VoIP application can take and the outputs it provides to a phone service.

TABLE 3

VoIP Application Call State Change Actions

| Action | Parameters | Description | Output |
| --- | --- | --- | --- |
| Set Audio Routing | Bluetooth, speakerphone, internal speaker, other audio output | Select destination for the audio stream. | Resulting audio routing state after attempting to apply the requested action. |
| Set Mute | New state (Boolean) | For muting or un-muting the call. | Resulting muting state after attempting to apply the requested action. |
| Set Hold | New state (Boolean) | For putting the call on hold, or taking it out of hold. | Resulting hold state after attempting to apply the requested action. |
| Using Video | New State (Boolean) | If the call involves sending and/or receiving video, the proximity sensor of the mobile device can be disengaged. Otherwise, the proximity sensor can be enabled for the duration of the call. | — |
| End Call | — | For informing the phone service that the call has ended. | — |

The phone service can also initiate changes in the state of a VoIP call and notify the corresponding VoIP application of such changes. For example, the phone service can change the state of a VoIP call from on-hold to off-hold due to another call being hosted by the mobile device having ended. In such cases, the VoIP application can respond with an acknowledgement that the change in state has been received. The phone service can update the information presented in any reduced call user interface displayed, if applicable.

Table 4 shows an exemplary set of actions that a phone service can take and the outputs it sends to a VoIP application. In other embodiments, the phone service and VoIP applications can perform call stage change actions in addition to those presented in Tables 3 and 4.

incoming VoIP call associated with a VoIP application installed on the mobile computing device is detected. In the example, the smartphone detects an incoming Skype™ call. At 1620, a native incoming call user interface is invoked with information associated with the incoming VoIP call. In the example, the VoIP application invokes the mobile computing device's native incoming call user interface, supplying the interface with Skype™ branding information, the Skype™ user name of the caller and information indicating that the incoming call is a video call. At 1630, an incoming call user interface is presented at a display of the mobile computing device based on the information associated with the incoming VoIP call. In the example, an incoming call user interface is

TABLE 4

Phone Service Call State Change Actions

| Phone Service Action | Parameters | Description | Output |
| --- | --- | --- | --- |
| Audio Routing Notification | Bluetooth, speakerphone, internal speaker, other audio destination | Communicate changes to audio routing state, such as when Bluetooth pairing takes place so that the VoIP application can reflect change in its in-call user interface. | Request confirmation that VoIP application has received the new state. |
| Hold Notification | New state (Boolean) | Notifying the VoIP application to put the call on hold. | Request confirmation that VoIP application has received the new state. |
| End Call Notification | — | To notify the application that it is to terminate the call, such as if the user selects the option to "end call + answer" on the incoming call user interface. | None. This action is unilateral and access to audio resources are revoked. |

Figure 16:
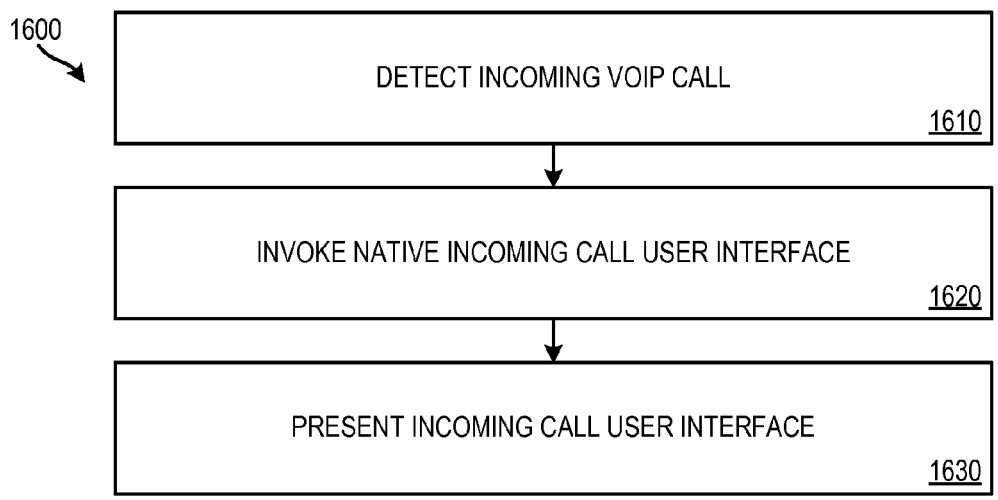
FIG. 16 is a flowchart of an exemplary method 1600 of managing calls at a mobile computing device.

FIG. 16 is a flowchart of an exemplary method 1600 of managing calls at a mobile computing device. The method 1600 can be performed by, for example, a smartphone on which the Skype™ VoIP application is installed. At 1610, an presented at the smartphone display and comprises a Skype™ logo and the caller's Skype™ user name.

Figure 17:
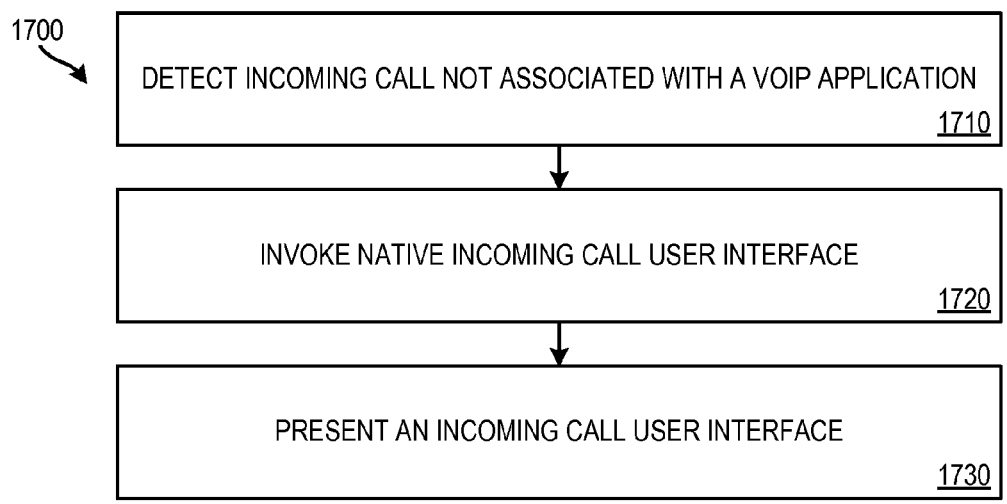
FIG. 17 is a flowchart of additional exemplary acts that can be performed as part of the exemplary method 1600.

The exemplary method 1600 can comprise additional acts. FIG. 17 is a flowchart of additional exemplary acts 1700 that can be performed as part of the exemplary method 1600. At 1710, an incoming call not associated with a VoIP application installed on the mobile computing device is detected. Continuing with the example of a smartphone executing Skype™, the smartphone detects an incoming AT&T voice call, AT&T being a mobile operator with which the user of the smartphone has a subscription. The incoming voice call is not associated with Skype™. At 1720, the native incoming call user interface is invoked with information associated with the incoming call not associated with a VoIP application installed on the mobile computing device. In the example, the native incoming call user interface is invoked with information indicating the calling party's name and phone number, and an image of the calling party retrieved from a contact book application installed at the smartphone. At 1730, an incoming call user interface is presented at the display of the mobile computing device based on the information associated with the incoming call not associated with a VoIP application installed on the mobile computing device. In the example, an incoming call interface is presented at the smartphone display comprising the caller's name, image and phone number.

Although the technologies described herein provide a unified user experience for VoIP calls associated with installed VoIP applications, the disclosed technologies can provide a unified user experience for VoIP calls associated with a VoIP service, regardless of whether a VoIP application associated with a VoIP service installed at the mobile device. A mobile device can determine whether an incoming VoIP call is associated with a VoIP service by, for example, comparing information received about the incoming VoIP call against a list of VoIP services stored at the mobile device, or by determining if the incoming call is a VoIP call associated with a mobile operator with which the mobile device user has a subscription (if not, then the mobile device could assume that the incoming call is associated with a VoIP service).

Any of the disclosed methods can be implemented as computer-executable instructions or a computer program product. Such instructions can cause a computer, including any of the mobile computing devices described herein, to perform any of the disclosed methods. The computer-executable instructions or computer program products as well as any data created and used during implementation of the disclosed embodiments can be stored on one or more computer-readable storage media (e.g., non-transitory computer-readable storage media, such as one or more optical media discs (such as DVDs or CDs), volatile memory components (such as DRAM or SRAM), or nonvolatile memory components (such as flash memory or hard drives)) and executed on a computer (e.g., any commercially available computer, including smartphones or other computing devices that include computing hardware). Computer-readable storage media does not include propagated signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it is to be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Having illustrated and described the principles of the illustrated embodiments, the embodiments can be modified in various arrangements while remaining faithful to the concepts described above. In view of the many possible embodiments to which the principles of the illustrated embodiments may be applied, it should be recognized that the illustrated embodiments are only examples and should not be taken as limiting the scope of the disclosure. We claim all that comes within the scope of the appended claims.

We claim:

1. A method of managing calls at a mobile computing device, comprising:
   detecting an incoming VoIP call associated with a VoIP application installed on the mobile computing device;
   invoking a native incoming call user interface with information associated with the incoming VoIP call;
   presenting an incoming call user interface based on the information associated with the incoming VoIP call, wherein the incoming call user interface allows a user to answer the incoming VoIP call while the mobile computing device is password-locked; and
   hosting the incoming VoIP call, wherein a video stream of the incoming VoIP call is not output at the mobile computing device while the mobile computing device is password-locked.

2. The method of claim 1, further comprising outputting the video stream of the incoming VoIP call at the mobile computing device after the mobile computing device has been unlocked.

3. The method of claim 2, further comprising presenting an in-call user interface provided by the VoIP application after the mobile computing device has been unlocked.

4. The method of claim 1, wherein the invoking the native incoming call user interface comprises providing the native incoming call user interface with branding information for the VoIP application and call modality information for the incoming VoIP call, the presenting the incoming call user interface comprising branding associated with the VoIP application and an indication of the modality of the incoming VoIP call.

5. The method of claim 1, further comprising:
   detecting an incoming call not associated with a VoIP application installed on the mobile computing device;
   invoking the native incoming call user interface with information associated with the incoming call not associated with a VoIP application installed on the mobile computing device; and
   presenting an incoming call user interface based on the information associated with the incoming call not associated with a VoIP application installed on the mobile computing device.

6. The method of claim 1, wherein the incoming VoIP call is a first call, the method further comprising simultaneously hosting the first call and a second call, the simultaneously hosting comprising presenting a reduced call user interface that causes the mobile computing device to switch between the first call and the second call as an active call when the reduced call user interface is selected by a user.

7. The method of claim 6, wherein an operating system of the mobile computing device manages the reduced call user interface.

8. The method of claim 6, wherein the mobile computing device is capable of performing the simultaneous hosting while the mobile computing device is password-locked.

9. The method of claim 6, wherein the second call is a VoIP call associated with the VoIP application.

10. The method of claim 1, further comprising prior to presenting the incoming call user interface, determining that the mobile computing device is not in an emergency call back mode.

11. The method of claim 1, further comprising preventing a user from placing a VoIP call via the VoIP application while the mobile computing device is in an emergency call-back mode.

12. The method of claim 1, further comprising the VoIP application determining to invoke the native incoming call interface.

13. One or more computer-readable storage media storing computer-executable instructions for causing a mobile computing device to perform a method, the method comprising:
   detecting an incoming VoIP call associated with a VoIP application installed on the mobile computing device;
   determining, by the VoIP application, to invoke a native incoming call interface;
   invoking the native incoming call user interface with information associated with the incoming VoIP call; and
   presenting an incoming call user interface based on the information associated with the incoming VoIP call.

14. The one or more computer-readable storage media of claim 13, wherein the incoming call user interface allows a user to answer the incoming VoIP call while the mobile computing device is password-locked.

15. The one or more computer-readable storage media of claim 13, the method further comprising:
   detecting an incoming call not associated with a VoIP application installed on the mobile computing device;
   invoking the native incoming call user interface with information associated the incoming call not associated with a VoIP application installed on the mobile computing device; and
   presenting an incoming call user interface at the display of the mobile computing device based on the information associated with the incoming call not associated with a VoIP application installed on the mobile computing device.

16. The one or more computer-readable storage media of claim 13, wherein the incoming VoIP call is a first call, the method further comprising simultaneously hosting the first call and a second call, the simultaneously hosting comprising presenting a reduced call user interface at a display of the mobile computing device that causes the mobile computing device to switch between the first call and the second call as an active call when the reduced call user interface is selected by a user, wherein at least a portion of the computer-executable instructions that manages the reduced call user interface is not part of a VoIP application installed at the mobile computing device.

17. The one or more computer-readable storage media of claim 16, wherein the mobile computing device is capable of performing the simultaneous hosting while the mobile computing device is password-locked.

18. A mobile computing device capable of carrying out a method, the method comprising:
   detecting a first incoming call associated with a VoIP application installed on the mobile computing device;
   invoking a native incoming call user interface with information associated with the first incoming call;
   detecting a second incoming call not associated with a VoIP application installed on the mobile computing device;
   invoking the native incoming call user interface with information associated with the second incoming call;
   simultaneously hosting the first incoming call and the second incoming call; and
   presenting a reduced call user interface that causes the mobile computing device to switch between the first incoming call and the second incoming call as an active call when the reduced call user interface is selected by a user;
   wherein the mobile computing device is password-locked during at least a portion of the simultaneous hosting.

* * * * *